(12) United States Patent
Giat et al.

(10) Patent No.: US 7,441,133 B2
(45) Date of Patent: Oct. 21, 2008

(54) RACK LEVEL POWER MANAGEMENT FOR POWER OVER ETHERNET

(75) Inventors: Yaniv Giat, Modiin (IL); Roni Blaut, Netanya (IL); Alon Ferentz, Bat Yam (IL); David Pincu, Holon (IL)

(73) Assignee: Microsemi Corp. - Analog Mixed Signal Group Ltd., Hod Hasharon (IL)

( * ) Notice: Subject to any disclaimer, the term of this patent is extended or adjusted under 35 U.S.C. 154(b) by 477 days.

(21) Appl. No.: 11/261,704

(22) Filed: Oct. 31, 2005

(65) Prior Publication Data

US 2006/0053324 A1    Mar. 9, 2006

Related U.S. Application Data

(63) Continuation-in-part of application No. 10/750,856, filed on Jan. 5, 2004, now Pat. No. 7,146,258, which is a continuation of application No. PCT/IL03/00832, filed on Oct. 14, 2003.

(60) Provisional application No. 60/695,190, filed on Jun. 30, 2005, provisional application No. 60/644,002, filed on Jan. 18, 2005, provisional application No. 60/418,599, filed on Oct. 15, 2002.

(51) Int. Cl.
*G06F 1/00* (2006.01)
*G06F 1/32* (2006.01)
(52) U.S. Cl. .................. 713/300; 713/320; 713/340
(58) Field of Classification Search .................. 713/300, 713/320, 330, 340
See application file for complete search history.

(56) References Cited

U.S. PATENT DOCUMENTS 5,483,656 A * 1/1996 Oprescu et al. .......... 713/320

5,544,064 A    8/1996 Beckwith .............. 364/483

(Continued)

FOREIGN PATENT DOCUMENTS

EP    0955573 A1    11/1999

(Continued)

OTHER PUBLICATIONS

ISR, EP, May 8, 2006, Search Report of PCT/IL2005/001136 to Giat.

(Continued)

*Primary Examiner*—Suresh K Suryawanshi
(74) *Attorney, Agent, or Firm*—Simon Kahn

(57) ABSTRACT

A method for rapidly powering a plurality of power over Ethernet ports constituted of: inputting an indication of available power; allocating a power budget to each of a first plurality of power over Ethernet devices; transmitting an enabling command for ports of a first priority to the first plurality of power over Ethernet devices, each of the first plurality of power over Ethernet devices powering ports of the first priority within the power budget; monitoring an indication of power consumption until the power consumption has stabilized; allocating an updated power budget to each of the first plurality of power over Ethernet devices, the power budget being a function of the available power and at least one of an indication of power consumption and power allocation; and transmitting an enabling command for ports of a second lower priority to the first plurality of power over Ethernet devices.

31 Claims, 10 Drawing Sheets

U.S. PATENT DOCUMENTS

| | | | |
|---|---|---|---|
| 5,550,702 A | 8/1996 | Schmidt et al. | 361/103 |
| 5,612,580 A | 3/1997 | Janonis et al. | 307/64 |
| 5,652,893 A | 7/1997 | Ben-Meir et al. | 395/750 |
| 5,914,585 A * | 6/1999 | Grabon | 320/125 |
| 5,969,515 A | 10/1999 | Oglesbee | 323/283 |
| 5,986,902 A | 11/1999 | Brkovic | 363/50 |
| 6,101,108 A | 8/2000 | Wittenbreder, Jr. | 363/65 |
| 6,108,183 A | 8/2000 | Beene | 361/93.8 |
| 6,144,194 A | 11/2000 | Varga | 323/285 |
| 6,233,693 B1 | 5/2001 | Berglund et al. | |
| 6,347,379 B1 * | 2/2002 | Dai et al. | 713/320 |
| 6,404,607 B1 | 6/2002 | Burgess et al. | 361/58 |
| 6,473,608 B1 | 10/2002 | Lehr et al. | 455/402 |
| 6,643,566 B1 | 11/2003 | Lehr et al. | 700/286 |
| 6,668,570 B2 * | 12/2003 | Wall et al. | 62/223 |
| 6,678,640 B2 * | 1/2004 | Ishida et al. | 702/189 |
| 6,841,979 B2 | 1/2005 | Berson et al. | 323/282 |
| 6,996,458 B2 | 2/2006 | Pincu et al. | 700/297 |
| 7,203,849 B2 | 4/2007 | Dove | |
| 7,240,225 B2 * | 7/2007 | Brewer et al. | 713/300 |
| 2002/0193908 A1 * | 12/2002 | Parker et al. | 700/258 |
| 2003/0042794 A1 * | 3/2003 | Jarrett, Jr. | 307/23 |
| 2003/0065958 A1 | 4/2003 | Hansen et al. | 713/300 |
| 2005/0272402 A1 | 12/2005 | Ferentz | 455/402 |

FOREIGN PATENT DOCUMENTS

| | | |
|---|---|---|
| WO | WO 96/19764 | 6/1996 |

OTHER PUBLICATIONS

Written Opinion, EP, May 8, 2006, Written Opinion for PCT/IL2005/001136 to Giat.

* cited by examiner

Wait for Power Stabilization Routine    Fig. 4

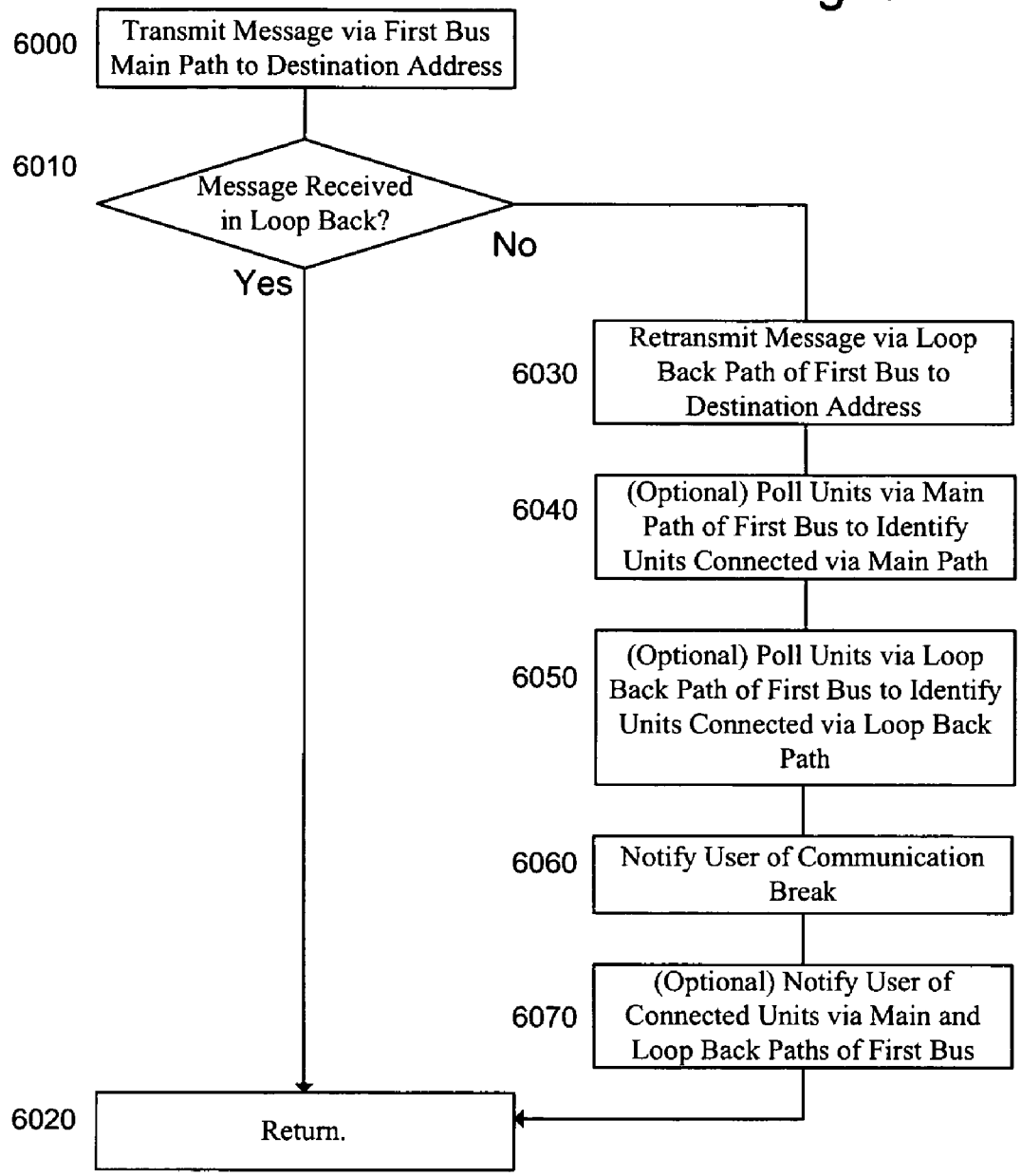

RACK LEVEL POWER MANAGEMENT FOR POWER OVER ETHERNET

CROSS-REFERENCE TO RELATED APPLICATIONS

This application claims priority from U.S. Provisional Patent Applications Ser. No. 60/695,190 filed Jun. 30, 2005 entitled "Backplane Power Management" and Ser. No. 60/644,002 filed Jan. 18, 2005 entitled "System for Providing Power Over Ethernet Through a Patch Panel, and is a continuation in part of U.S. patent application Ser. No. 10/750,856 filed Jan. 5, 2004 now U.S. Pat. No. 7,146,258 entitled "Direct Current Power Pooling" which is a continuation of PCT Patent Application PCT/IL03/00832 filed Oct. 14, 2003 which claims priority from U.S. Provisional Patent Application Ser. No. 60/418,599 filed Oct. 15, 2002. This application is related to co-filed U.S. Patent Applications entitled "Rack Level Power Management" identified by Ser. No. 11/261,707; "Method for Detecting Parameter of a Remote Device" identified by Ser. No. 11/261,706; and "System for Providing Power Over Ethernet Through a Patch Panel" identified by Ser. No. 11/261,705. The entire contents of each of the above applications are incorporated herein by reference.

BACKGROUND OF THE INVENTION

The present invention relates to the field of remote powering, and more particularly to a means for power management of rack mounted remote powering systems having a plurality of shared power sources.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power backup; and centralized security and management.

Several patents addressed to this issue exist including: U.S. Pat. No. 6,473,608 issued to Lehr et al., whose contents are incorporated herein by reference and U.S. Pat. No. 6,643,566 issued to Lehr et al., whose contents are incorporated herein by reference. Furthermore a standard addressed to the issue of powering remote devices over an Ethernet based network, known as Power over Ethernet (PoE), has been published as IEEE 802.3af-2003, whose contents are incorporated herein by reference.

PoE is typically a scalable technology, in which an initial installation may supply power functionality to a limited number of ports in the system. Over time, additional ports may require power, with a resultant need for additional sources of power. Each port supplies power to a connected powered device (PD), with power being transmitted from the port to the PD over the structured communication cabling. For each group of ports to be powered, a PoE managing circuit is provided to accomplish detection, optional classification, powering and monitoring in accordance with the above standard. In order to ensure an orderly turn on of multiple ports, and to enable management and control of ports in the event that the demand for power by ports exceeds the power available, ports are assigned priorities. In one embodiment, priorities are assigned based on physical port numbers. In another embodiment, priorities are user settable, preferably in levels. In an exemplary embodiment 3 user settable levels are available for each port. Ports of like priority level are then further prioritized by physical port number.

PoE devices such as PoE enabled switches, PoE midspans and PoE enabled patch panels typically comprise, or have associated therewith, a plurality of PoE managing circuits. A single device may provide power to 1, 6, 12, 24 or 48 ports or any other number of ports. Some ports may have PDs attached thereto, whereas other ports may not. In an exemplary embodiment, a switch supporting 48 ports may comprise 4 PoE managing circuits, each of the PoE managing circuits controlling power for up to 12 ports.

As indicated above, as additional PDs to be powered are added the required power may begin to meet or exceed the initially supplied power. One well developed method of adding additional power to a system is the use of a plurality of power sources, or power banks, which are connected together in a power sharing arrangement.

A major difficulty in the use of a plurality of power sources is the action that must be taken in the event of a failure, or reduced output, of one of the plurality of power sources. For example, in a network in which power over Ethernet is supplied to a large number of PDs, groups of PDs receive their power from one of a plurality of PoE managing circuits each of which obtains power from the plurality of power sources. In the event of a failure of one of the plurality of power sources powering the plurality of PoE managing circuits, some ports of selected PoE managing circuits supplying power to some PDs must be disabled so as to avoid an excess load on the remaining power sources which may result in overall system failure or shut down. Furthermore, the PDs which are not to be disabled are preferably to be shielded from any adverse effect from the failed power source. This requires rapid action in the case of power source failure, preferably by disabling or reducing power drawn by sufficient ports, so as to reduce the total power drawn within a short time period, such as 20 milliseconds, or more preferably 2 milliseconds. Disabling or reducing power drawn by sufficient ports prevents an overload condition on the remaining power sources. It is to be understood that shutting down power to a port is herein used interchangeably with disabling a PD, since each PD is connected to, and receives power from, a specific port.

Furthermore, at start up or upon the addition of a power source to the plurality of power sources, a large number of ports may be potentially powerable. In prior art systems, the PoE devices are typically responsive to a host controller which sends power enabling commands to enable all port of the PoE device. Alternatively, the host controller may enable specific ports of the PoE device. The term enabling as used herein means authorizing the powering of a connected port, in the event that the PoE managing circuit detects that a valid PD is attached thereto. In one embodiment the enabling is done responsive to detection and optional classification, and in another embodiment the enabling is done prior to detection and optional classification. In the event that a port has not been enabled, detection and optional classification may be accomplished however subsequent powering is not accomplished.

In the event that a plurality of PoE devices are connected, each of the plurality of PoE devices having attached thereto a number of PDs requiring powering, the amount of power required to power all of the attached PD may exceed that power available. Furthermore, upon initial powering of a PD, an inrush current which is in excess of the normal operating current is typically observed. One solution is to enable all the attached PoE devices, unfortunately this will result in a power demand exceeding total available power, resulting in early power supply failure or unreliable powering of at least one port. This problem is further exacerbated by the inrush current. Furthermore, global priority is not maintained, as individual PoE devices may power according to priority, however priority across PoE devices is not adhered to. This may result in low priority ports attached to a first PoE device being powered, while a high priority port attached to a second PoE device is not powered.

Another solution is for the host controller to individual enable ports, the host controller awaiting confirmation of powering responsive to an initial command before enabling additional ports. Unfortunately this is very time consuming, and for very large systems results in unacceptable delays. In one non-limiting example of such a sequential powering method, in which enabling detection, classification, powering and reporting a specific port occupies a 1 second cycle time, enabling 1,000 ports requires in excess of 15 minutes.

What is therefore needed, and not known in the prior art, is a method for rapidly enabling powering of ports suitable for use in a large system having a plurality of PoE devices, each of the PoE devices controlling a plurality of ports.

SUMMARY OF THE INVENTION

Accordingly, it is a principal object of the present invention to overcome the disadvantages of prior art. This is provided in the present invention by inputting an indication of available power, and allocating a power budget to each PoE device connected based on the input available power. Ports of a first priority are then enabled, with each PoE device powering ports of the first priority up to the allocated power budget. PoE devices which are unable to power ports of the first priority due to the limitation of the power budget subsequently receive an updated power budget until all ports of the first priority are powered.

According to an aspect of the invention power consumption is monitored after an enabling command is transmitted. Power consumption is monitored until stabilization indicative that all ports have been powered responsive to the enabling command is recognized.

In the event that sufficient power is available, ports of the next priority are then powered in a similar fashion. Thus all ports of a higher priority are enabled prior to enabling ports of a lower priority. Furthermore there is no requirement for confirmation that powering has been completed. The use of power budgets further allows for continued operation in the event of a communication failure.

The invention provides for a method for rapidly powering a plurality of power over Ethernet ports, the method comprising: inputting an indication of available power; allocating a power budget to each of a first plurality of power over Ethernet devices, each of the power over Ethernet devices powering at least one power over Ethernet port, the power budget being a function of the indication of available power; in the event that the indication of available power is greater than a first predetermined amount, transmitting an enabling command to the first plurality of power over Ethernet devices, the command enabling the powering of ports of a first priority associated with the first plurality of power over Ethernet devices, each of the first plurality of power over Ethernet devices powering ports of the first priority within the power budget.

In one embodiment, in the event that the indication of an amount of available power is not greater than the first predetermined amount, transmitting an enabling command to one of a single power over Ethernet device and a second plurality of power over Ethernet devices, the second plurality being a subset of the first plurality, the command enabling the powering of ports of the first priority associated with the one of a single power over Ethernet device and a second plurality of power over Ethernet devices, each of the one of a single power over Ethernet device and a second plurality of power over Ethernet devices powering ports of the first priority within the power budget.

In one embodiment the power budget is allocated equally to all of the first plurality of power over Ethernet devices. In another embodiment the power budget is allocated to each of the first plurality of power over Ethernet devices as a function of the number of ports per power over Ethernet device. In another embodiment the power budget is allocated to each of the first plurality of power over Ethernet devices as a function of priority of ports associated with each power over Ethernet device. In another embodiment the first predetermined amount is a function of inrush current associated with at least one power over Ethernet port.

In one embodiment the method further comprises after the stage of transmitting an enabling command: monitoring an indication of power consumption; and in the event the indication of power consumption has stabilized: allocating an updated power budget to each of the first plurality of power over Ethernet devices, the power budget being a function of the available power and the indication of power consumption. In one further embodiment the stabilization of the indication of power consumption is determined by fuzzy logic. In another further embodiment the stabilization of the indication of power consumption is determined by comparing the rate of change of the indication of power consumption with a second predetermined limit. In another further embodiment the method further comprises after the stage of allocating an updated power budget: transmitting an enabling command to the first plurality of power over Ethernet devices, the command enabling the powering of ports of a second priority associated with the first plurality of power over Ethernet devices, each of the first plurality of power over Ethernet devices powering ports of the second priority within the updated power budget, the second priority being lower than the first priority. In another further embodiment the method further comprises after the stage of allocating an updated power budget: inputting an updated indication of available power; in the event that the updated indication of available power is greater than the first predetermined amount, transmitting an enabling command to the first plurality of power over Ethernet devices, the command enabling the powering of ports of a second priority associated with the first plurality of power over Ethernet devices, each of the first plurality of power over Ethernet devices powering ports of the second priority within the updated power budget, the second priority being lower than the first priority. Preferably, the indication of available power is a function of power allocated by at least one power over Ethernet device.

In one embodiment the method further comprises: inputting an indication of one of total power consumption and total power allocation; comparing the indication of one of total power consumption and total power allocation with a third predetermined amount; and in the event the indication of one of total power consumption and total power allocation exceeds the third predetermined amount; transmitting a command to stop powering additional ports to the first plurality of power over Ethernet devices. Preferably, the third predetermined amount is associated with a guard band for the plurality of power over Ethernet devices.

The invention independently provides for a system for powering a plurality of power over Ethernet ports, the system comprising: at least one power source; a power manager receiving an indication of power available from the at least one power source; a first plurality of power over Ethernet devices responsive to the power manager and arranged to receive power from the at least one power source, each of the power over Ethernet devices being operable to supply power for at least one power over Ethernet port associated therewith; the power manager being operative to: allocate a power budget to each of a first plurality of power over Ethernet devices, the power budget being a function of the indication of available power; in the event that the indication of available power is greater than a first predetermined amount, transmit an enabling command for ports of a first priority to the first plurality of power over Ethernet devices, the first plurality of power over Ethernet devices being operable responsive to the transmitted enabling command to enable the powering of power over Ethernet ports associated therewith having the first priority, each of the first plurality of power over Ethernet devices powering ports of the first priority within the power budget.

In one embodiment, in the event that the indication of an amount of available power is not greater than the first predetermined amount, transmit an enabling command for ports of the first priority to one of a single power over Ethernet device and a second plurality of power over Ethernet devices, the second plurality being a subset of the first plurality, the one of a single power over Ethernet device and a second plurality of power over Ethernet devices being operable responsive to the enabling command to enable the powering of ports of the first priority associated therewith, each of the one of a single power over Ethernet device and a second plurality of power over Ethernet devices powering ports of the first priority within the power budget.

In one embodiment the power budget is allocated equally to all of the first plurality of power over Ethernet devices. In another embodiment the power budget is allocated to each of the first plurality of power over Ethernet devices as a function of the number of ports per power over Ethernet device.

In one embodiment the power budget is allocated to each of the first plurality of power over Ethernet devices as a function of priority of ports associated with each power over Ethernet device. In another embodiment the first predetermined amount is a function of inrush current associated with at least one power over Ethernet port.

In one embodiment the power manager is further operable to: monitor an indication of power consumption; and in the event the indication of power consumption has stabilized: allocate an updated power budget to each of the first plurality of power over Ethernet devices, the power budget being a function of the available power and the indication of power consumption.

In one embodiment the stabilization of the indication of power consumption is determined by fuzzy logic. In another embodiment the stabilization of the indication of power consumption is determined by the power manager being operable to compare the rate of change of power consumption with a second predetermined limit.

In one embodiment the power manager is further operable to transmit an enabling command for ports of a second priority to the first plurality of power over Ethernet devices, the power over Ethernet devices being operable responsive to the received command to enable the powering of ports of a second priority associated with the first plurality of power over Ethernet devices within the updated power budget, the second priority being lower than the first priority. In another embodiment herein the power manager is further operative to: input an updated indication of available power; in the event that the updated indication of available power is greater than the first predetermined amount, transmit an enabling command for ports of a second priority to the first plurality of power over Ethernet devices, each of the first plurality of power over Ethernet devices being operative responsive to the enabling command to power ports of the second priority within the updated power budget, the second priority being lower than the first priority.

In one embodiment the power manager is further operative to: input an indication of total power consumption; compare the indication of total power consumption with a third predetermined amount; and in the event the indication of total power consumption exceeds the third predetermined amount; transmit a command to stop powering additional ports to the first plurality of power over Ethernet devices. Preferably, the third predetermined amount is associated with a guard band for the plurality of power over Ethernet devices.

Independently the invention provides for a system for powering a plurality of power over Ethernet ports, the system comprising: at least one power source; a plurality of power over Ethernet devices circuits receiving power from the at least one power source, each of the power over Ethernet devices controlling power for at least one power over Ethernet port; a power manager receiving an indication of power availability and power consumption from the at least one power source; the power manager being operative to: transmit a power allocation to each of the plurality of power over Ethernet devices, the power allocation being a function of the indication of power availability; transmit an enabling command for ports of a first priority to the plurality of power over Ethernet devices; monitor the indication of power consumption from the at least one power source, and in the event that the rate of change of power consumption is less than a predetermined amount, transmit an enabling commands for ports of second priority to the plurality of power over Ethernet devices, the second priority being lower than the first priority.

In one embodiment the at least one power source comprises a plurality of power sources. Preferably, the indication of power availability is responsive to an output of each of the plurality of power sources.

Independently, the invention provides for a method for rapidly powering a plurality of power over Ethernet ports, the method comprising: inputting an indication of available power; allocating a power budget to each of a first plurality of power over Ethernet devices, each of the power over Ethernet devices powering at least one power over Ethernet port, the power budget being a function of the indication of available power; transmitting an enabling command for ports of a first priority to the first plurality of power over Ethernet devices, each of the first plurality of power over Ethernet devices powering ports of the first priority within the power budget; monitoring an indication of power consumption until the power consumption has stabilized; allocating an updated power budget to each of the first plurality of power over Ethernet devices, the power budget being a function of the available power and the indication of power consumption; and transmitting an enabling command for ports of a second priority to the first plurality of power over Ethernet devices, the second priority being lower than the first priority.

Additional features and advantages of the invention will become apparent from the following drawings and description.

BRIEF DESCRIPTION OF THE DRAWINGS AND TABLE

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1 is a high level block diagram of a PoE system known to the prior art, comprising a first plurality of power sources and a second plurality of PoE devices, each of the second plurality of PoE devices providing power for a third plurality of ports;

FIG. 2A is a high level block diagram of a power over Ethernet system, in accordance with the principle of the invention, comprising a first plurality of power sources each power source having a status indicator in communication with a power manager, and a second plurality of PoE devices each of the second plurality of PoE devices providing power for a third plurality of ports in accordance with the principle of the current invention;

Figure 2A:
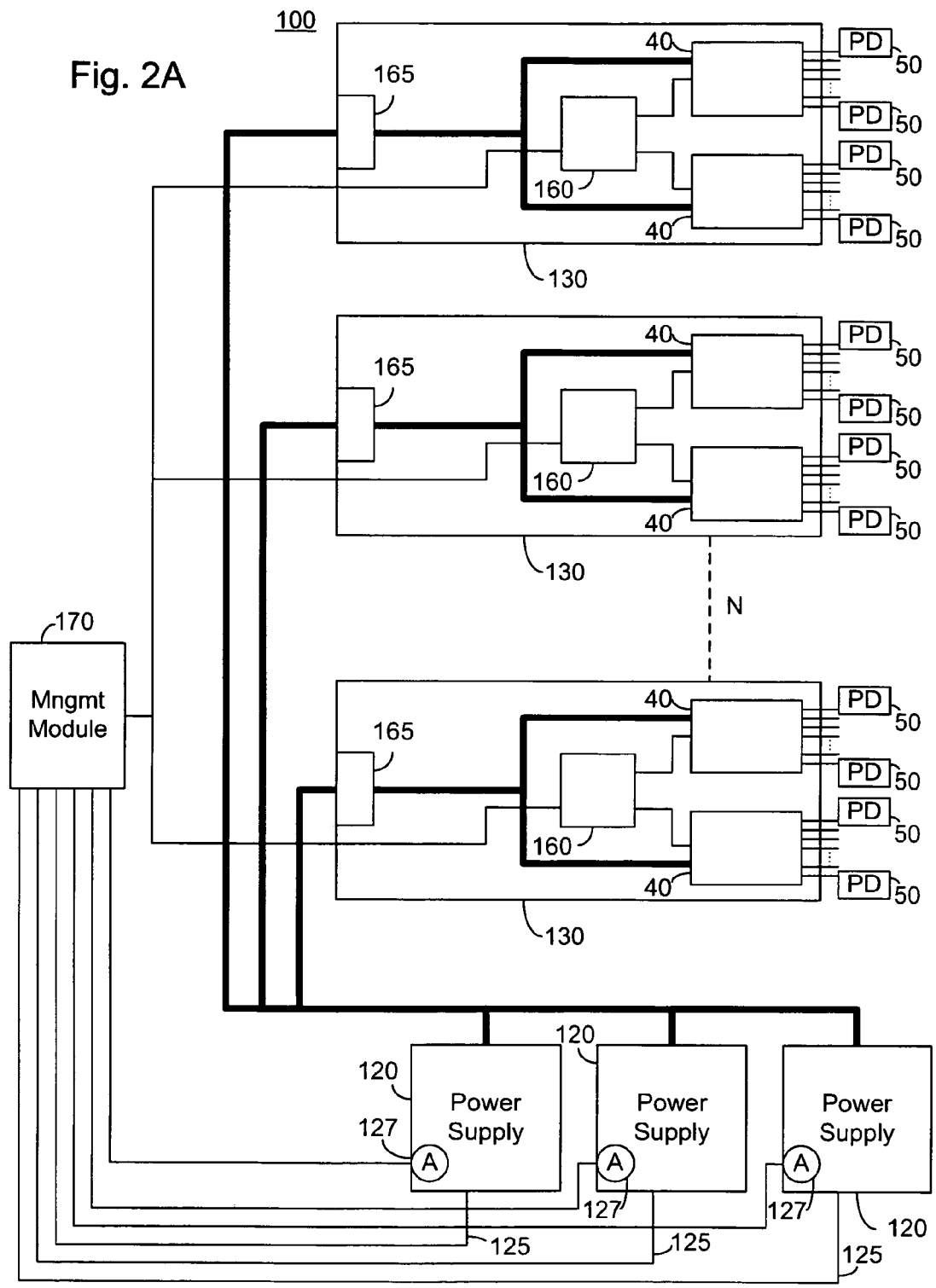
FIG. 2B is a high level block diagram of an embodiment of the data connection of FIG. 2A exhibiting a first and second data bus in accordance with the principle of the current invention.
Figure 2B:
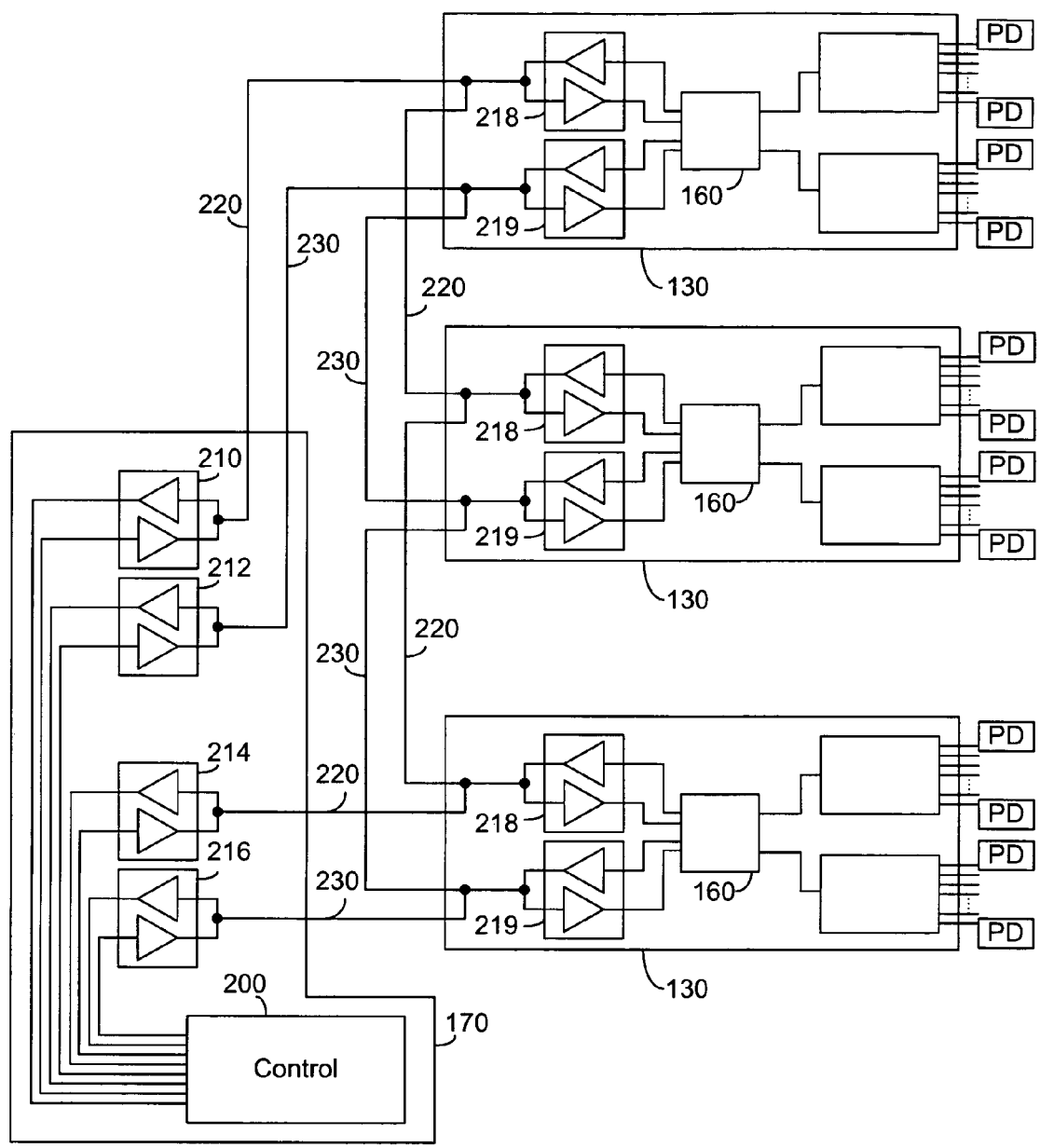
Figure 6:
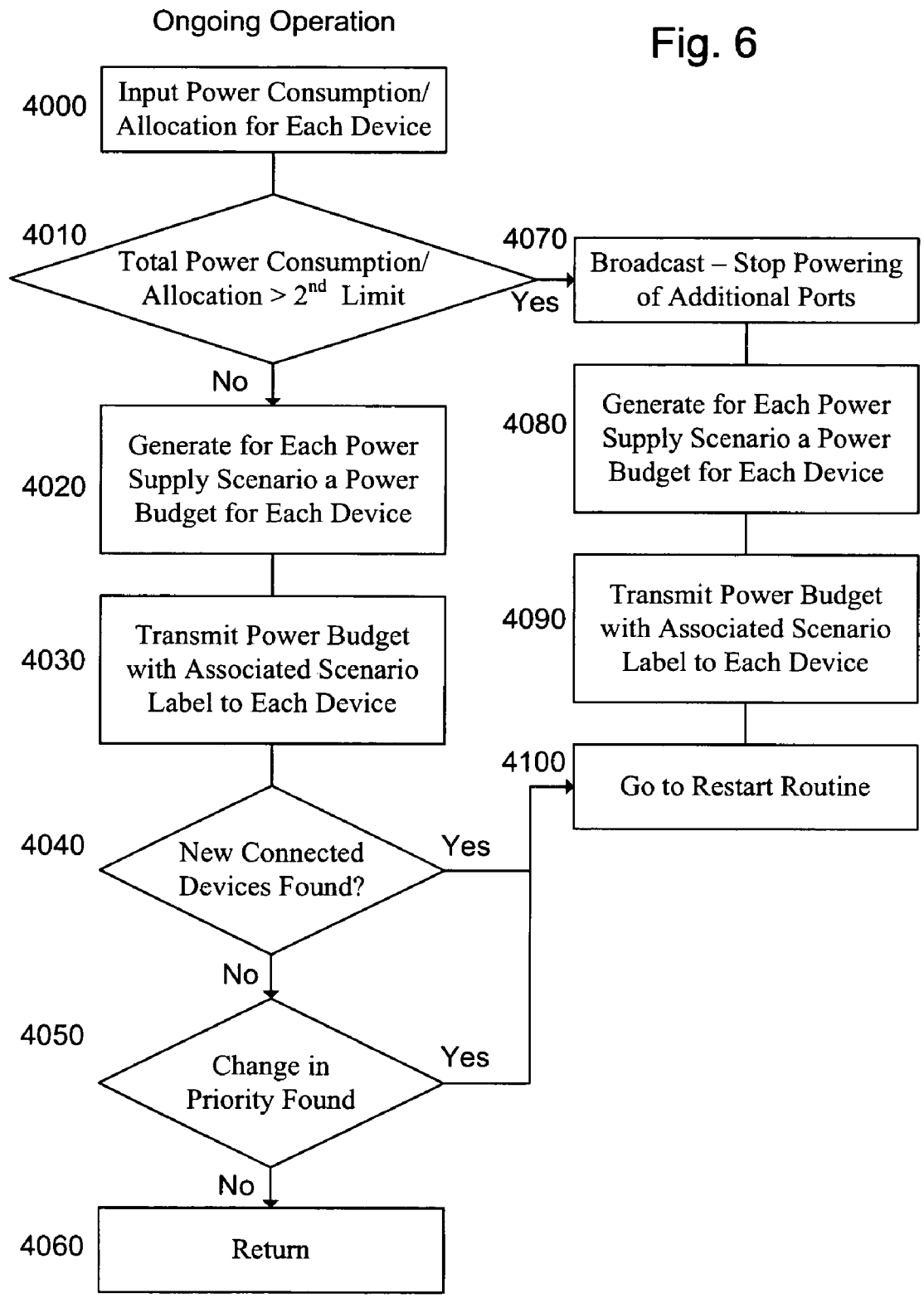
FIG. 6 is a high level flow chart of an ongoing operation of the power manager of FIG. 2A to maintain a potential scenario chart comprising power budgets for each PoE device according to an aspect of the invention.
Figure 8B:
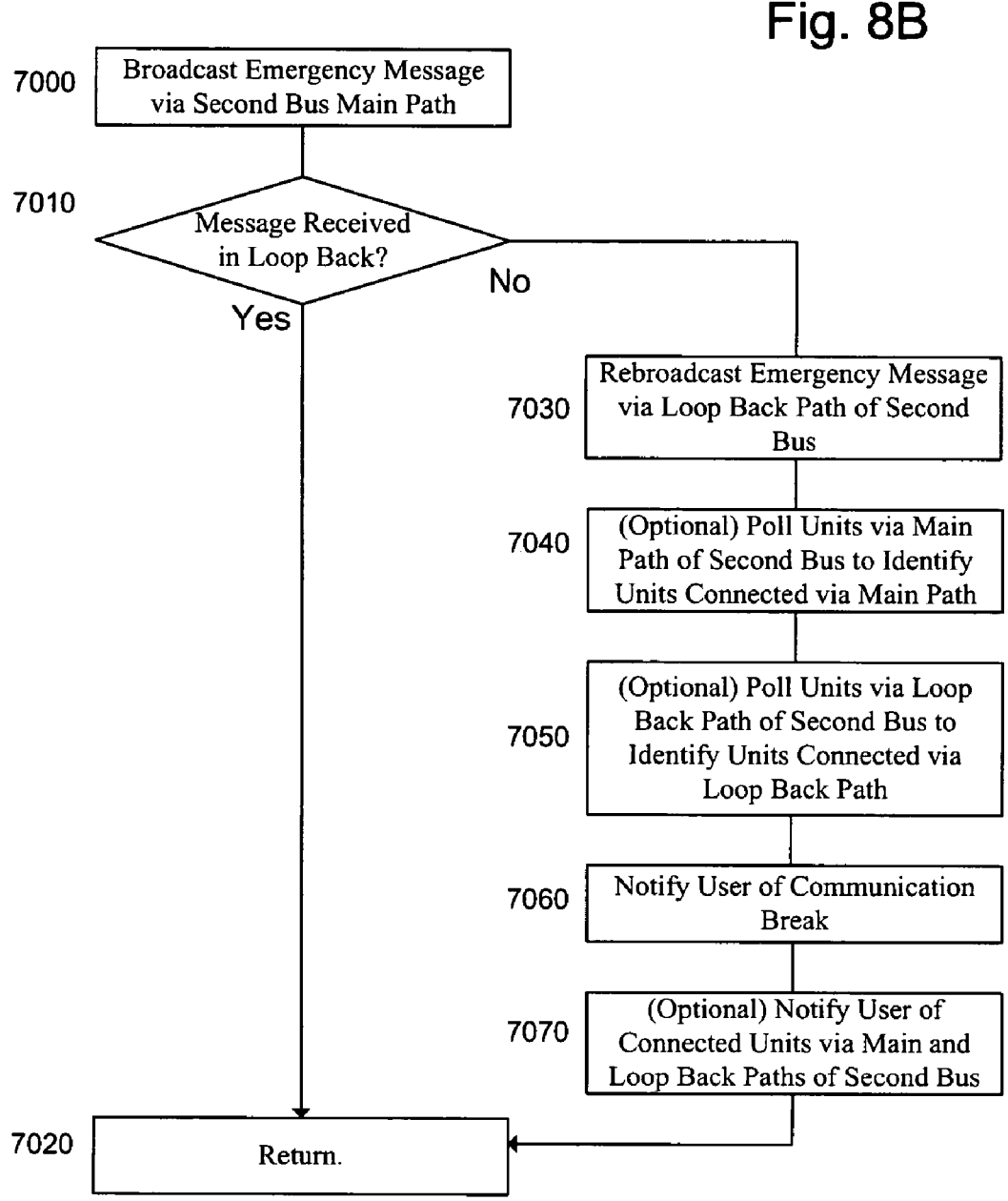
FIG. 8A is a high level flow chart of the operation of the management module of FIG. 2B to communicate via a main path of a first bus, and in the event of the transmitted message not being detected via the loop back path of the first bus, retransmitting the message via the loop back path of the first bus in accordance with the principle of the current invention.

FIG. 8B is a high level flow chart of the operation of the management module of FIG. 2B to broadcast emergency messages via a main path of a second bus, and in the event of the broadcast message not being detected via a loop back path of the second bus, rebroadcasting the message via the loop back path of the second bus in accordance with the principle of the current invention; and Table I is a representation of an embodiment of the potential scenario chart produced as an outcome of the method of FIG. 6 in accordance with the principle of the invention.

DETAILED DESCRIPTION OF PREFERRED EMBODIMENTS

The present embodiments enable rapidly powering a large number of ports connected to disparate PoE devices, each of the PoE devices receiving power from a central power source. Preferably the central power source comprises a plurality of power supplies. This is provided by inputting an indication of available power, and allocating a power budget to each PoE device connected based on the input available power. Ports of a first priority are then enabled, with each PoE device powering ports of the first priority up to the allocated power budget. PoE devices which are unable to power ports of the first priority due to the limitation of the power budget subsequently receive an updated power budget until all ports of the first priority are powered.

According to an aspect of the invention power consumption is monitored after an enabling command is transmitted. Power consumption is monitored until stabilization indicative that all ports have been powered responsive to the enabling command is recognized.

In the event that sufficient power is available, ports of the next priority are then powered in a similar fashion. Thus all ports of a higher priority are enabled prior to enabling ports of a lower priority. Furthermore there is no requirement for confirmation that powering has been completed. The use of power budgets further allows for continued operation in the event of a communication failure.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
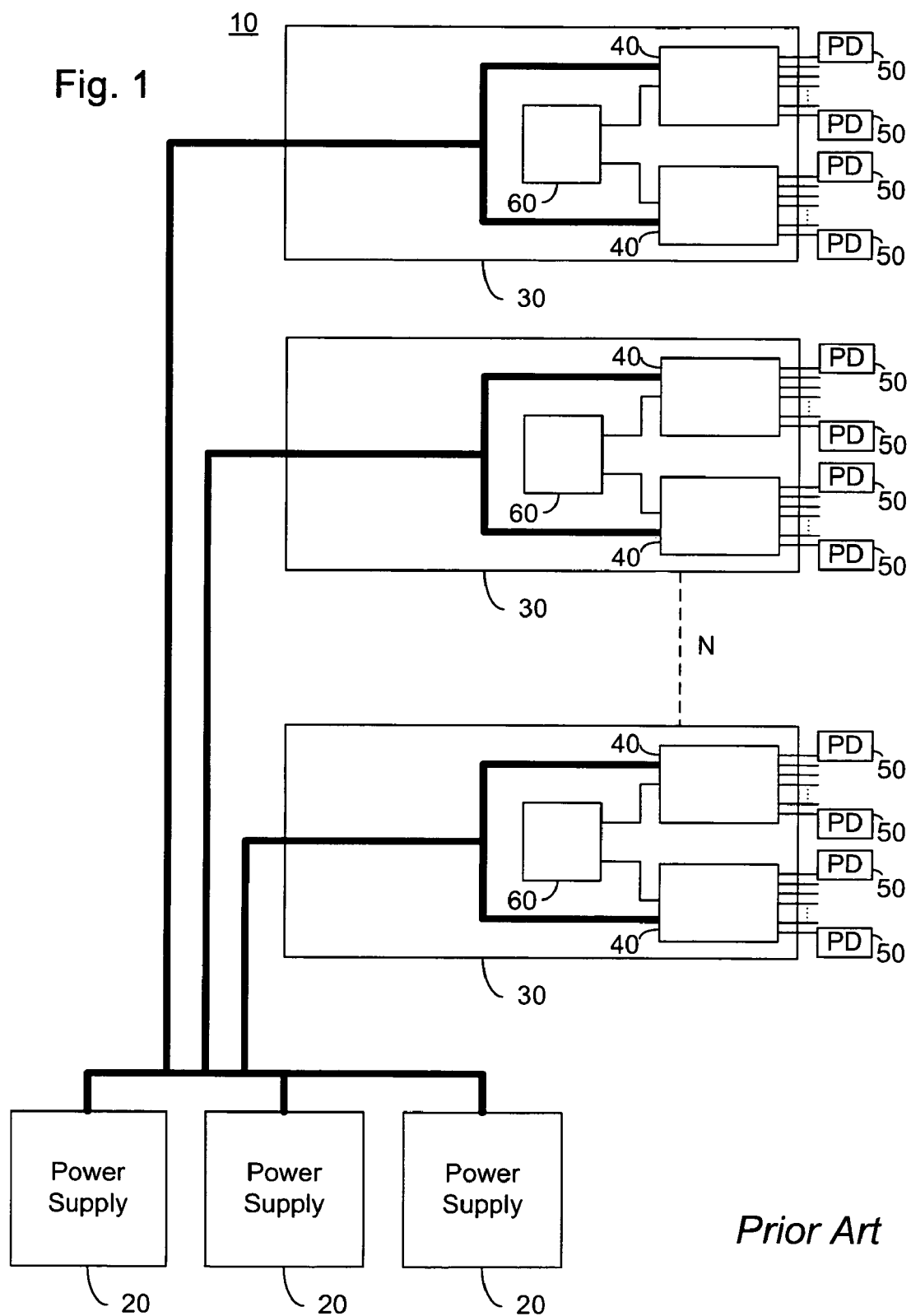

FIG. 1 is a high level block diagram of a PoE system 10, known to the prior art, comprising a first plurality of power sources and a second plurality of PoE devices, each of the second plurality of PoE devices providing power for a third plurality of ports. PoE system 10 comprises a first plurality of power supplies 20, a second plurality of PoE devices 30 and a third plurality of PDs 50. Each PoE device 30 comprises at least one PoE managing circuit 40 and a PoE controller 60. In an exemplary embodiment each PoE managing circuit 40 is attached to a number of ports, and some or all of the ports have attached thereto over twisted pair communication cabling a PD 50. PoE controller 60 is shown as being a separate unit from PoE managing circuit 40, however this is not meant to be limiting in any way. PoE controller 60 may be incorporated into one or more PoE managing circuits 40 without exceeding the scope of the invention.

The plurality of power supplies 20 are connected together in a power sharing arrangement, illustrated herein as a common shared bus, and each of the plurality of PoE devices 30 exhibits a connection to the common shared bus, the connection being operatively supplied to the PoE managing circuits 40 in the respective PoE device 30. Within each PoE device 30, PoE controller 60 is connected to operatively control each of the PoE managing circuits 40.

In operation, the plurality of power supplies 20 operate in a power sharing arrangement to supply power to the respective PoE managing circuits 40 comprised within each of the PoE devices 30. The PoE managing circuits 40 operate under the control of the respective PoE controller 60 to interrogate, optionally classify, and subsequently power connected PDs 50. In the event of a failure of one or more of the power supplies 20 no means are provided to notify the respective PoE controllers 60 of the shortage of power in the system, and therefore an overload condition on the remaining power supplies 20 may occur. Furthermore, each PoE controller 60 operates independently, without knowledge or interaction with other PoE controllers 60 in other PoE devices 30. Thus, a high priority port in a first PoE device 30 receives no effective priority over a low priority port in a second PoE device 30.

FIG. 2A is a high level block diagram of a PoE system 100, in accordance with the principle of the invention, comprising a first plurality of power sources each power source having a status indicator in communication with a power manager, and a second plurality of PoE devices each of the second plurality of PoE devices providing power for a third plurality of ports in accordance with the principle of the current invention. PoE system 100 comprises a plurality of power supplies 120 each exhibiting a status indicator signal 125, and a current indicator 127; a plurality of PoE devices 130; a plurality of PDs 50; and a management module 170. Each PoE device 130 comprises at least one PoE managing circuit 40, a PoE controller 160 and a hot swap controller 165. In an exemplary embodiment each PoE managing circuit 40 is attached to a number of ports, and some or all of the ports have attached thereto over twisted pair communication cabling a PD 50. PoE controller 160 is shown as being a separate unit from PoE managing circuit 40, however this is not meant to be limiting in any way. PoE controller 160 may be incorporated into one or more of PoE managing circuit 40 without exceeding the scope of the invention.

The plurality of power supplies 120 are connected together in a power sharing arrangement, illustrated herein as a common shared bus, and each of the plurality of PoE devices 130 exhibits a connection through the respective hot swap controller 165 to the common shared bus, the connection being operatively supplied to the PoE managing circuits 40 in the respective PoE device 130. Within each PoE device 130, PoE controller 160 is connected to operatively control each of the PoE managing circuits 40. Respective status indicators 125 are each connected to an input of management module 170. In an exemplary embodiment each status indicator 125 comprises information regarding at least one of a power good signal of the respective power supply 120, a temperature of the respective power supply 120 and a stress level of the respective power supply 120. Status indicator 125 is illustrated as a separate data connection from each power supply 120, however this is not meant to be limiting in any way. In one embodiment the data connection is replaced with external sensors, and in another embodiment the data connection is part of a data bus arrangement. Each current indicator 127 from respective power supply 120 is illustrated as a separate data connection from each power supply 120, however this is not meant to be limiting in any way. In one embodiment the data connection is replaced with external sensors, and in another embodiment the data connection is part of a data bus arrangement.

A data connection is exhibited between management module 170 and each PoE controller 160. In one embodiment the data connection between management module 170 and each PoE controller 160 is accomplished in a high speed data bus, such as an EIA 485 as defined by the Electronic Industry Alliance of Arlington, Va. EIA 485 is also known as RS 485. In another embodiment the data connection between management module 170 and each PoE controller 160 comprises a pair of data busses: a first data bus being of a high speed, such as 1 Mbps, and carrying ongoing messages as will be described further hereinto below; and a second data bus being of a lower speed, such as 100 Kbps, and carrying emergency messages and addressing information as will be described further hereinto below. The second data bus is hereinto referred to as the emergency bus. In an exemplary embodiment the data connection between management module 170 and each PoE controller 160 is accomplished via a bidirectional single twisted wire pair bus in a ring configuration. In such an embodiment management module 170 observes the bus to ensure that messages sent by management module 170 have traveled the entire bus. In the event of a sensed communication failure, messages are optionally resent in the reverse direction thereby improving communication reliability.

In operation, the plurality of power supplies 120 operate in a power sharing arrangement to supply power to the respective PoE managing circuits 40 comprised within each of the PoE devices 130. Preferably, each of the PoE devices 130 are hot swappable at least partially as a result of the operation of the respective hot swap controller 165. Status indicators 125 output status information regarding respective power supplies 120, and are received by management module 170. Current indicators 127 output information regarding the output current of respective power supplies 120, and are received by management module 170. Management module 170 is further operable to communicate with each PoE controller 160 so as to communicate data regarding the priority of each port of the respective PoE devices 130. Advantageously management module 170 thus has available an overall map of all connected ports and their priorities, enabling power to be allocated according to priority irrespective of the PoE device 130 in which the port is located. PoE managing circuits 40 operate under control of the respective PoE controller 160 to interrogate, optionally classify, and subsequently power connected PDs 50.

Management module 170 is operative in a manner that will be explained further hereinto below, to maintain a table of power scenarios indicative of potential states of the various status indicators 125. Thus, in the event of a failure of one or more power supply 120, management module 170 responsive to the change in the respective status indicator 125 is operable to look up the appropriate actions in the pre-stored power scenario table so as to react in sufficient time so as to reduce consumption thereby limiting the amount of time for which an overload condition may be present. Management module 170 is further operable, in a manner that will be explained further hereinto below, to rapidly enable power to a plurality of ports in each PoE device 130 when excess power greater than a first predetermined limit is available. In one non-limiting example of excess power availability, during start up of PoE system 100 prior to enabling any of the ports of PoE system 100 the amount of power available is well in excess of the power consumption. Management module 170 thereby enables power in accordance with priority, irrespective of the PoE device 130 in which the high priority ports are located. Preferably the first predetermined limit is associated with the inrush current expected from each of the PoE devices 130.

Each PoE controller 160 is preferably operable to receive a power budget from management module 170 and to apply power to ports attached to PoE device 130 via PoE managing circuits 40 in accordance with the received budget. Thus, PoE controller 160 functions as a local power budget supervisor. Additionally, each PoE controller 160 is preferably operable to power ports attached to PoE device 130 via PoE managing circuits 40 in accordance with a set priority. In an exemplary embodiment the priority is set by a user utilizing a host computer or controller communicating with PoE controller 160. In another embodiment the priority is set by a user utilizing a host computer or controller communicating with management module 170, management module 170 communicating the received priority setting to PoE controller 160. In another embodiment at least one PD 50 supplies a priority in communication with PoE controller 160. In yet another embodiment powering is priority is at least partially responsive to a classification of the associated PD 50. In another embodiment (not shown) at least one PoE device 130 supplies power to PDs 50 via a power ready patch panel and the PoE device 130 receives configuration information, including a priority level, from the power ready patch panel, as further described in copending patent application entitled "System for Providing Power Over Ethernet through a Patch Panel" the entire contents of which is incorporated herein by reference. In such an embodiment, PoE device 130 receiving priority laden information from the power ready patch panel shares the priority information with management module 170.

FIG. 2B is a high level block diagram of an embodiment of the data connection of FIG. 2A exhibiting a first and second data bus in accordance with the principle of the current invention comprising: a management module 170; a first, second and third PoE device 130; a first bus 220; and a second bus 230. Management module 170 comprises a control circuit 200, a first transceiver 210, a second transceiver 212, a third transceiver 214 and a fourth transceiver 216. Each of first, second and third PoE device 130 comprises a first transceiver 218, a second transceiver 219 and a PoE controller 160.

Control 200 is connected to the input of the transmitter of each of first, second, third and fourth transceiver 210, 212, 214 and 216 of management module 170 and to the output of the receiver of each of first, second, third and fourth transceiver 210, 212, 214 and 216 of management module 170. The output of the transmitter of first transceiver 210 of management module 170 is connected to the receiver of first transceiver 210 of management module 170 and by a portion of first bus 220 to both the output of the transmitter of first transceiver 218 of first PoE device 130 and the input of the receiver of first transceiver 218 of first PoE device 130. The output of the transmitter of second transceiver 212 of management module 170 is connected to the receiver of second transceiver 212 of management module 170 and by a portion of second bus 230 to both the output of the transmitter of second transceiver 219 of first PoE device 130 and the input of the receiver of second transceiver 219 of first PoE device 130.

PoE controller 160 of first PoE device 130 is connected to the output of the receiver of first transceiver 218 of first PoE device 130, to the input of the transmitter of first transceiver 218 of first PoE device 130, to the output of the receiver of second transceiver 219 of first PoE device 130, and to the input of the transmitter of second transceiver 219 of first PoE device 130. The output of the transmitter of first transceiver 218 of first PoE device 130 is connected by a portion of first bus 220 to both the output of the transmitter of first transceiver 218 of second PoE device 130 and the input of the receiver of first transceiver 218 of second PoE device 130. The output of the transmitter of second transceiver 219 of first PoE device 130 is connected by a portion of second bus 230 to both the output of the transmitter of second transceiver 219 of second PoE device 130 and the input of the receiver of second transceiver 219 of second PoE device 130.

PoE controller 160 of second PoE device 130 is connected to the output of the receiver of first transceiver 218 of second PoE device 130, to the input of the transmitter of first transceiver 218 of second PoE device 130, to the output of the receiver of second transceiver 219 of second PoE device 130, and to the input of the transmitter of second transceiver 219 of second PoE device 130. The output of the transmitter of first transceiver 218 of second PoE device 130 is connected by a portion of first bus 220 to both the output of the transmitter of first transceiver 218 of third PoE device 130 and the input of the receiver of first transceiver 218 of third PoE device 130. The output of the transmitter of second transceiver 219 of second PoE device 130 is connected by a portion of second bus 230 to both the output of the transmitter of second transceiver 219 of third PoE device 130 and the input of the receiver of second transceiver 219 of third PoE device 130.

PoE controller 160 of third PoE device 130 is connected to the output of the receiver of first transceiver 218 of third PoE device 130, to the input of the transmitter of first transceiver 218 of third PoE device 130, to the output of the receiver of second transceiver 219 of third PoE device 130, and to the input of the transmitter of second transceiver 219 of third PoE device 130. The output of the transmitter of first transceiver 218 of third PoE device 130 is connected by a portion of first bus 220 to both the output of the transmitter of third transceiver 214 of management module 170 and the input of the receiver of third transceiver 214 of management module 170. The output of the transmitter of second transceiver 219 of third PoE device 130 is connected by a portion of second bus 230 to both the output of the transmitter of fourth transceiver 216 of management module 170 and the input of the receiver of fourth transceiver 216 of management module 170. In an exemplary embodiment transceivers 210, 212, 214, 216, 218 and 219 each operate according to EIA-485, and in a preferred embodiment first and second transceiver 210, 212 operate as the master for first and second buses 220, 230 respectively.

In operation first bus 220 and second bus 230 are connected in a daisy chain or ring arrangement, exhibiting internal direct connections in each of first, second and third PoE device 130, and first bus 220 and second bus 230 loop back to management module 170. Thus, first bus 220 and second bus 230 are operational irrespective of the operation of each of first, second and third PoE devices 130. Control 200 is operational to communicate ongoing messages to and from each of first, second and third PoE devices 130 via first transceiver 210 and first bus 220, and to further receive the transmitted messages via third transceiver 214 and the loop back path of first bus 220. Control 200 is further operational to communicate emergency messages to each of first, second and third PoE devices 130 via second transceiver 212 of management module 170 and second bus 230, and to further receive the transmitted emergency messages via fourth transceiver 216 of management module 170 and the loop back path of second bus 230.

Advantageously, control 200 monitors the loop back path of first bus 220, and in the event that messages transmitted by control 200 via first transceiver 210 of management module 170 are not received at third transceiver 214 of management module 170, control 200 is operational to notify a user of a communication break. Control 200 is further operational to retransmit messages not received at third transceiver 214 of management module 170 via third transceiver 214 of management module 170 via the loop back path. Thus, third transceiver 214 of management module 170 acts as a master for the portion of first bus 220 still connected to third transceiver 214 of management module 170 via the loop back path and first transceiver 210 of management module 170 acts as a master for the portion of first bus 220 connected to first transceiver 210 of management module 170, also called hereinafter the main path. Thus, first, second and third PoE devices 130 are in communication with management module 170 despite a break in first bus 220. In one embodiment control 200 further polls each of first, second and third PoE device 130 via each of the main and loop back paths of first bus 220, and reports to a user an identifier of which PoE device 130 remains connected to each of the main and loop back paths.

Advantageously, control 200 monitors the loop back path of second bus 230, and in the event that messages transmitted by control 200 via second transceiver 212 of management module 170 are not received at fourth transceiver 216 of management module 170, control 200 is operational to notify a user of a communication break. Control 200 is further operational to retransmit messages not received at fourth transceiver 216 of management module 170 via fourth transceiver 216 of management module 170 via the loop back path. Thus, fourth transceiver 216 of management module 170 acts as a master for the portion of second bus 230 still connected to fourth transceiver 216 of management module 170 via the loop back path and second transceiver 212 of management module 170 acts as a master for the portion of second bus 230 connected to second transceiver 212 of management module 170, also called hereinafter the main path. Thus, first, second and third PoE devices 130 are in communication with management module 170 despite a break in second bus 230. In one embodiment control 200 further polls each of first, second and third PoE device 130 via each of the main and loop back paths of second bus 230, and reports to a user an identifier of which PoE device 130 remains connected to each of the main and loop back paths.

Preferably, second bus 230 is held open to be available for time sensitive messages to be sent by control 200, and no time is lost by control 200 regaining control of second bus 230 due to communication from one of first, second and third PoE device 130.

FIG. 8A is a high level flow chart of the operation of management module 170 of FIG. 2B to communicate via a main path of first bus 220, and in the event of the transmitted message not being detected via the loop back path of first bus 220, retransmitting the message via the loop back path of first bus 220 in accordance with the principle of the current invention. In stage 6000, a message is transmitted via the main path of the first bus to a destination address, for example by utilizing first transceiver 210 of management module 170. Management module 170 preferably acts as the bus master and assigns addresses to each of first, second and third PoE devices, or other devices found attached thereto.

In stage 6010, control 200 monitors the loop back path of first bus 220, for example via third transceiver 214 of management module 170. In the event that the message transmitted in stage 6000 is received via the loop back path, the communication ring of the first bus is intact, and in stage 6020 the routine returns.

In the event that in stage 6010 the message transmitted in stage 6000 is not received via the loop back path, indicating that the communication ring of first bus 220 is not intact, in stage 6030 the message of stage 6000 is retransmitted via the loop back path of first bus 220, for example by utilizing third transceiver 214 of management module 170. Thus, PoE devices 130, and other devices, which remain connected to management module 170 via the loop back path of first bus 220, receive communication irrespective of the break in first bus 220.

In optional stage 6040, devices are polled via the main path of first bus 220, and units responding are identified as connected via the main path to management module 170. In optional stage 6050, devices are polled via the loop back path of first bus 220, and units responding are identified as connected via the main path to management module 170. In stage 6060, management module 170 notifies a user of the communication break. In option stage 6070, identifiers of units identified in optional stages 6040, 6050 are further communicated to the user, thus indicating further information as to the location of the break. In stage 6020 the routine returns.

FIG. 8B is a high level flow chart of the operation of management module 170 of FIG. 2B to broadcast emergency messages via a main path of second bus 230, and in the event of the broadcast message not being detected via the loop back path of second bus 230, rebroadcasting the message via the loop back path of second bus 230 in accordance with the principle of the current invention. In stage 7000, an emergency message is broadcast via the main path of the second bus to a destination address, for example by utilizing second transceiver 212 of management module 170. Management module 170 preferably acts as the bus master and assigns addresses to each of first, second and third PoE devices, or other devices found attached thereto.

In stage 7010, control 200 monitors the loop back path of second bus 230, for example via fourth transceiver 216 of management module 170. In the event that the message broadcast in stage 7000 is received via the loop back path, the communication ring of the second bus is intact, and in stage 7020 the routine returns.

In the event that in stage 7010 the emergency message broadcast in stage 7000 is not received via the loop back path, indicating that the communication ring of second bus 230 is not intact, in stage 7030 the emergency message of stage 7000 is rebroadcast via the loop back path of second bus 230, for example by utilizing fourth transceiver 216 of management module 170. Thus, PoE devices 130, and other devices, which remain connected to management module 170 via the loop back path of second bus 230, receive emergency broadcast messages irrespective of the break in second bus 230.

In optional stage 7040, devices are polled via the main path of second bus 230, and units responding are identified as connected via the main path to management module 170. In optional stage 7050, devices are polled via the loop back path of second bus 230, and units responding are identified as connected via the main path to management module 170. In stage 7060, management module 170 notifies a user of the communication break. In option stage 7070, identifiers of units identified in optional stages 7040, 7050 are further communicated to the user, thus indicating further information as to the location of the break. In stage 7020 the routine returns.

The routines of FIGS. 8A and 8B have been explained with second bus 230 being utilized for broadcast of emergency messages, and first bus 220 being utilized for ongoing communication; however this is not meant to be limiting in any way. Second bus 230 may be utilized to assign addresses for use by first bus 220 without exceeding the scope of the invention. First bus 220 and second bus 230 may proceed in a single cable, and thus a break in one of first bus 220 and second bus 230 may most likely be indicative of a break in a second one of first bus 220 and second bus 230 without exceeding the scope of the invention.

Figure 3:
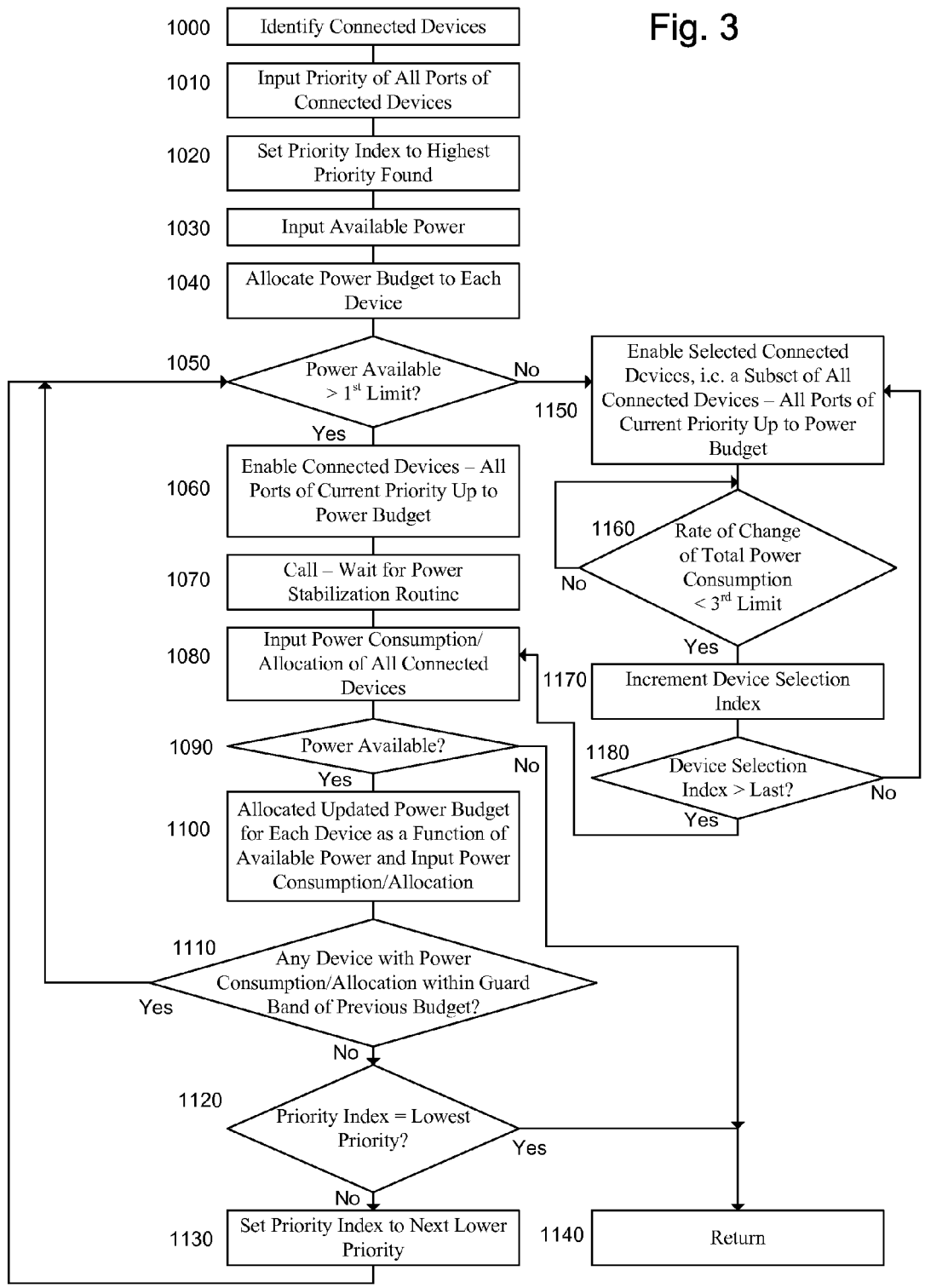
FIG. 3 is a high level flow chart of the operation of the power manager of FIG. 2A in the event of a power on event so as to rapidly enable powering of ports while preserving overall priority in accordance with the principle of the current invention.

FIG. 3 is a high level flow chart of the operation of management module 170 of FIG. 2A in the event of a powering on event so as to rapidly enable powering of ports while preserving overall priority in accordance with the principle of the current invention. In stage 1000 all connected PoE devices 130 are identified. In an exemplary embodiment the stage of identification comprises allocating addresses to each identified PoE device. In one embodiment address allocation is accomplished on the emergency bus, thus not disturbing ongoing data transmission. In stage 1010 the priority of all ports of all connected PoE devices 130 is input. Preferably the priority information comprises the amount of ports supported by each PoE device 130. In one embodiment a host computer or controller (not shown) is operable by a user to set priority by communication with PoE controller 160 of each PoE device 130. In another embodiment a host computer or controller is operable by a user to set priority by communication with management module 170. In yet another embodiment PoE device 130 receives priority information from a connected power ready patch panel. In yet another embodiment a connected PD communicates its priority directly to an associated PoE device 130. Thus management module 170 has input information regarding all ports powerable in system 100 and their associated priority.

In stage 1020 a priority index is set to the highest priority found within system 100. In an exemplary embodiment a total of 3 independent priority levels are established. In stage 1030 information regarding the total available power for powering the ports identified in stages 1000 and 1010 is input. In an exemplary embodiment status information 125 in combination with current indicator 127 provides information regarding power availability. In another embodiment a host controller or computer is operable by a user to input a rated power capability of each power supply 120 exhibiting a power good signal via status information 125. In one embodiment the rated power is discounted by an estimate of the power usage of management module 170 and other inherent losses in the system including power used by each PoE controller 160 and PoE managing circuit 40. In one embodiment the power usage reported by PoE controller 160 comprises power being transmitted to connected PDs 50, and therefore does not comprise power utilized by PoE controller 160 and PoE managing circuit 40. In such an embodiment management module 170 must additionally preserve a power budget for these unreported usages. In another embodiment the power usage reported by controller 160 comprises power allocated by a PoE managing circuit 40 due to classification irrespective as to the amount of power actually drawn by a PD 50.

In stage 1040 a power budget is determined for each PoE device 130. In one embodiment the total available power input in stage 1030 is divided equally among all PoE devices 130. In another embodiment the total available power input in stage 1030 is allocated among PoE devices 130 in accordance with the number of ports in each of the PoE devices 130. Thus, in an embodiment in which a first PoE device 130 supports twice as many ports as a second PoE device 130, the first PoE device 130 is allocated twice the power budget of the second PoE device 130. In yet another embodiment the power budget is determined in accordance with priority, thus PoE devices 130 exhibiting high priority ports are allocated a power budget ahead of PoE devices 130 exhibiting exclusively low priority ports. The above embodiments are not meant to be limiting in any way and are specifically meant to include utilizing a combination of factors to allocate a power budget. The power budgets determined are transmitted to PoE controller 160 of each PoE device 130 and stored in management module 170.

In stage 1050 the total available power determined in stage 1030 is compared to a first predetermined limit. In an exemplary embodiment the first predetermined limit is associated with the inrush current requirements of the associated PoE devices 130 and the inrush current capabilities of power supplies 120. In one non-limiting example, each PoE controller 160 is operable to notify management module 170 of the amount of ports which may be simultaneously powered. In an exemplary embodiment each PoE managing circuit 40 is limited to a single inrush current at time, i.e. each PoE managing circuit 40 may enable only port at a time and power supplies 120 are not configured to supply inrush current in excess of their rated capacity. The inrush current at port enablement exhibits a limit of up to 450 mA in accordance with aforementioned standard, and this inrush current may be independent of a normal low operating current. Thus, in one embodiment a PD 50 exhibiting a power usage of only 7 watts may exhibit an inrush current at enabling of approximately 25 watts. Furthermore, in one embodiment PoE controller 160 does not take inrush current into account, and thus power usage may be over budget during port enabling. A plurality of PoE devices 130 exhibiting an excess inrush current simultaneously is preferably avoided by setting the first predetermined limit equal to the inrush current expected from each PoE device 130 times the number of PoE devices 130. The first predetermined limit may not be a fixed value, and may be determined at each execution of stage 1050 as a function of power consumption, number of devices and other factors.

In the event that in stage 1050 the total available power is greater than the first predetermined limit, in stage 1060 all ports of priority equal to or greater than the priority index are enabled by sending a command to PoE controllers 160 of the respective PoE devices 130. In an exemplary embodiment a broadcast message is sent enabling powering of all connected ports of priority equal to or greater than the priority index. It is to be understood that enabling is only authorized up to the power budget determined and transmitted in stage 1040. As described above, the power budget does not take into account inrush current issues. PoE controllers 160 thus operate respective PoE managing circuits 40 to detect, optionally classify and power any detect PD 50 connected to a port of the priority equal to the priority index.

Figure 4:
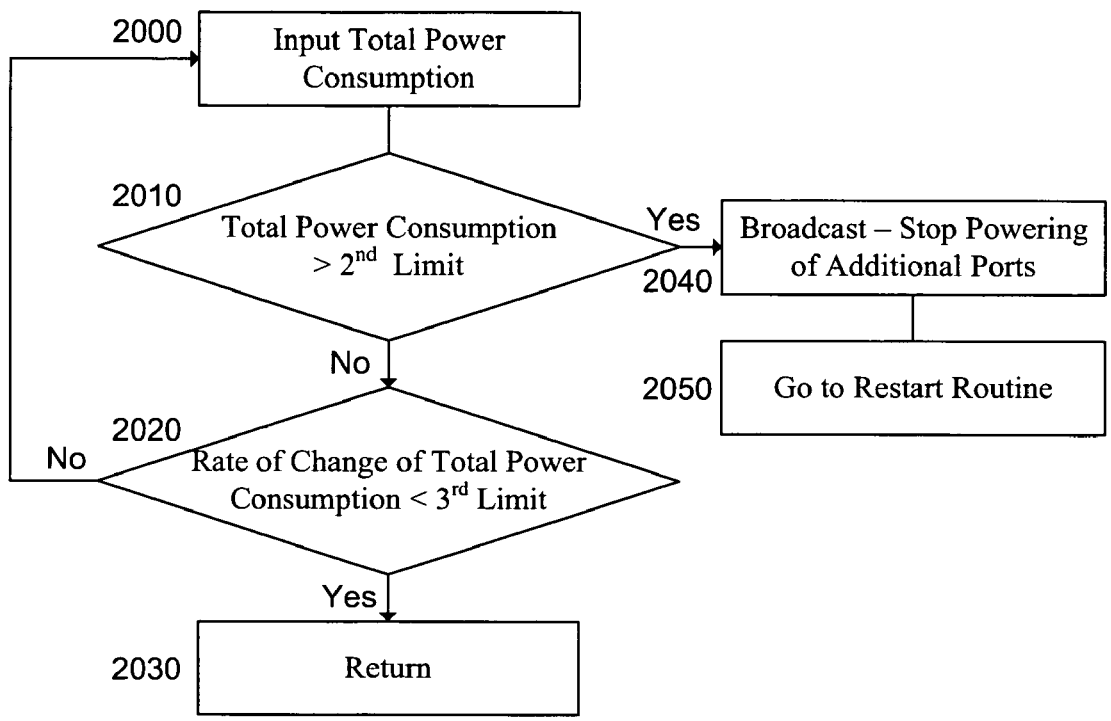
FIG. 4 is a high level flow chart of a routine to await power stabilization prior to enabling further powering according to an aspect of the invention.

In stage 1070 a wait routine which will be detailed further hereinto below in relation to FIG. 4 is called. The wait routine preferably is operable to ensure that power has stabilized in response to the enabling of stage 1060 prior to proceeding to stage 1080. In an exemplary embodiment the routine of FIG. 4 is operable to ensure that the derivative of the change in power usage is below a predetermined second limit thus ensuring that powering responsive to stage 1060 is complete prior to proceeding to stage 1080. In stage 1080 power consumption of all PoE devices 130 is input. In one embodiment management module 170 communicates with each PoE controller 160 and receives an indication of power consumption. In another embodiment power consumption is input based on current indicator 127 of power supplies 120, however in this embodiment an indication of power consumption is input from each PoE device 130 and stored for use with stage 1100 as will be described further. Stage 1080 has been described as being based solely on actual power consumption however this is not meant to be limiting in any way and is specifically meant to include operation based on power allocation by classification. In one such embodiment in stage 1080 all PoE devices 130 report the power allocated to detected and classified PDs 50.

In stage 1090 power availability is determined as a function of the available total power input in stage 1030 and the total power consumption or power allocation by classification input in stage 1080. In one embodiment power available less than the inrush current of a single PD 50 is considered as no available power. In another embodiment power supplies 120 are capable of supplying inrush current in excess of a steady state maximum power and power available less than the power requirement of a single PD 50 is considered as no available power.

In the event that in stage 1090 available power is found, in stage 1100 an updated power budget for each PoE device 130 is determined as a function of the available total power input in stage 1030 and the total power consumption or power allocation by classification input in stage 1080. In one embodiment an unused power is determined as the difference between the available total power input in stage 1030 and the total power consumption or power allocation by classification input in stage 1080. The unused power is in one further embodiment divided equally among PoE devices 130 and in another further embodiment the unused power is allocated among PoE devices 130 in accordance with the number of ports in each of the PoE devices 130. In yet another embodiment the unused power is allocated in accordance with priority, thus PoE devices 130 exhibiting high priority ports are allocated unused power ahead of PoE devices 130 exhibiting exclusively low priority ports. The above embodiments are not meant to be limiting in any way and are specifically meant to include utilizing a combination of factors to divide any unused power. Additionally, a combination of actual power consumption and allocation may be utilized. For example in the event of that allocation is utilized, power consumption is further reviewed to ensure that no PoE devices 130 have power consumption in excess of allocation due to a PD 50 drawing more power than was allocated by PoE managing circuit 40.

The unused power herein allocated is added to the previous power budget determined and stored, for example in stage 1040. Any previous power budget stored by management module 170 is relabeled as a previous power budget and stored by management module 170. The updated power budgets determined are transmitted to PoE controller 160 of each PoE device 130 and stored as the current power budget. The updated power budgets and the previous power budget are thus both stored by management module 170.

In stage 1110 the power consumption or allocation by classification input from each PoE device 130 in stage 1080 is compared to the respective previous power budget stored in stage 1100. In the event that for any PoE device 130 the power consumption or allocation by classification input in stage 1080 is within a predetermined guard band of previous power budget, stage 1050 as described above is repeated. The guard band is pre-selected to ensure that subsequent powering of a detected PD 50 will not result in PoE device 130 exceeding the power budget allocated. In another embodiment stage 1110 is replaced by inputting from each PoE device 130 a report indicating that at least one port of the current priority or higher has not been enabled due to the previous power budget. Thus, an updated power budget is determined and transmitted in stage 1100, and in response at least one PoE device 130 whose power consumption was within the predetermined guard band of the previous power budget may upon receiving an enable command power at least one additional port of a priority equal to or greater than the priority index.

In the event that in stage 1110 for all PoE devices 130 the power consumption or allocation by classification input in stage 1080 is not within a predetermined guard band of previous power budget, in stage 1120 the priority index is compared with a lowest priority. In one embodiment the lowest priority is a predetermined value, and in another embodiment the lowest priority is determined from among all priorities input in stage 1010. In the event that the priority index is not equal to the lowest priority, in stage 1130 the priority index is set to the next lower priority and stage 1050 as described above is again executed. In the event that in stage 1120 the priority index is equal to the lowest priority, in stage 1140 the method has enabled powering of all powerable ports of all priorities and returns.

In the event that in stage 1090 no available power is found, in stage 1140 the method has enabled powering of all powerable ports within the available power and returns.

In the event that in stage 1050 the total available power is not greater than the first predetermined limit, in stage 1150 at least one PoE device 130, i.e a subset of the identified PoE devices 130 of stage 1000 and stage 1040, is commanded to enable all ports of a priority equal to the priority index by sending a command to PoE controllers 160 of the respective PoE devices 130.

The number of PoE devices 130 to be so commanded is a function of the amount of available power and in particular the tolerance of power supplies 120 to inrush current. In one embodiment each PoE device 130 is individually enabled and in another embodiment a plurality of PoE devices 130 the sum of whose potential inrush current will not exceed the total available inrush current capability of power supplies 120 are enabled. Each enabled PoE device 130 is only authorized to enable ports of the priority index up to the allocated power budget. The allocated power budget may be the power budget originally determined and transmitted in stage 1040, or an updated power budget as determined and transmitted in stage 1100. As described above, the power budget does not take into account inrush current issues. PoE controllers 160 thus operate respective PoE managing circuits 40 to detect, optionally classify and power any detect PD 50 connected to a port of the priority equal to the priority index.

In stage 1160 the rate of change of total power consumption as input from power supplies 120 is observed and compared with a third predetermined limit. In an exemplary embodiment the third predetermined limit is set to allow for normal power variations during operation while detecting a leveling in power usage. Thus a rapid increase in power usage during enabling of ports is detected and completion of the powering is determined without requiring further communication between management module 170 and each of the plurality of PoE devices 130. In an exemplary embodiment stage 1160 is performed by fuzzy logic. Stage 1160 is described herein as observing the rate of change of total power consumption, however this is not meant to be limiting in any way. Stage 1160 may be replaced with a stage awaiting confirmation from each of the enabled plurality of PoE devices 130 that enabling has been completed without exceeding the scope of the invention.

In the event that in stage 1160 the rate of change of total power consumption is not less than the third predetermined limit, stage 1160 is again executed. In the event that in stage 1160 the rate of change of total power consumption is less than the third predetermined limit, in stage 1170 the list of devices is incremented to point to devices that have not yet been enabled by the operation of stage 1150. In stage 1180 the incremented list is compared with a last device pointer. In the event that the last device has been reached, i.e. all PoE devices 130 have been enabled by an operation of stage 1150, stage 1080 as described above is executed. In the event that the last device has not been reached, i.e. at least one PoE device 130 has not yet been enabled by the operation of stage 1150, stage 1150 is again executed for at least one PoE device 130 which has not yet been enabled.

Thus the method of FIG. 3 enables rapid powering of all ports in the system, while maintaining priority. It is to be understood that at the completion of the method of FIG. 3 each PoE device 130 receives a power budget and is enabled to operate autonomously within the received power budget while observing local priorities. Thus, in an event of communication interruption, each PoE device is able to continue operation without interruption. Such a method is advantageously thus not reliant on a continued communication link between each PoE device 130 and management module 170 to ensure operation.

FIG. 4 is a high level flow chart of a routine to await power stabilization prior to enabling further powering according to an aspect of the invention. As described above this routine is called by a main routine to wait for power stabilization prior to proceeding. While this routine is being described a subroutine called by a main routine with a return after completion this is not meant to be limiting in any way. The routine may run as separate thread or process and send an interrupt upon completion without exceeding the scope of the invention.

In stage 2000 the total power consumption is input. In one embodiment management module 170 communicates with each PoE controller 160 and receives an indication of power consumption. In a preferred embodiment power consumption is input based on current indicator 127 of power supplies 120. In stage 2010 the total power consumption input in stage 2000 is compared with a predetermined second limit. In an exemplary embodiment the second limit is an overall guard band for system 100 in which no additional ports may be powered without reaching inrush current limits of the overall system. In an exemplary embodiment the second limit is associated with the inrush current requirements of the associated PoE devices 130, the number of PoE devices which have been enabled, and the inrush current capabilities of power supplies 120. In one non-limiting example, each PoE controller 160 is operable to notify management module 170 of the amount of ports which may be simultaneously powered. In one embodiment the second predetermined limit is the same as the first predetermined limit described above in relation to stage 1050 of FIG. 3. Thus, an overall guard band as represented by the pre-determined second limit enables each power budget as transmitted to the individual PoE devices 130 to be used to the maximum extent possible, with system power being maintained within a safe range by other PoE devices 130 not utilizing their full budgeted power. In the event of usage up to the maximum budgeted power by a plurality of PoE devices 130 an overall guard band is thus maintained by the operation of stage 2010. The guard band thus prevents damage to power supplies 120 by the simultaneous start up of a plurality of ports and their associated large inrush current.

In the event that in stage 2010 total power consumption is not greater than the second predetermined limit, in stage 2020 the rate of change of total power consumption is observed and compared with a third predetermined limit. In an exemplary embodiment the third predetermined limit is set to allow for normal power variations during operation while detecting a leveling in power usage. Thus a rapid increase in power usage during enabling of ports is detected and completion of the powering is determined without requiring further communication between management module 170 and each of the plurality of PoE devices 130. In an exemplary embodiment stage 2020 in particular, and the method of FIG. 4 in general is performed by fuzzy logic. Stage 2020 is described herein as observing the rate of change of total power consumption, however this is not meant to be limiting in any way. Stage 2020 may be replaced with a stage awaiting confirmation from each of the enabled plurality of PoE devices 130 that enabling has been completed without exceeding the scope of the invention.

In the event that in stage 2020 the rate of change of total power consumption is not less than the third predetermined limit, stage 2000 is again executed. In the event that in stage 2020 the rate of change of total power consumption is less than the third predetermined limit, in stage 2030 the routine returns.

In the event that in stage 2010 the total power consumption input in stage 2000 is greater than the second predetermined limit, in stage 2040 a broadcast message is sent to all PoE device 130 and in particular to the respective PoE controller 160 to stop enabling any additional unpowered ports. In one embodiment the broadcast message is sent on the provided emergency bus. In stage 2050 the routine is exited to the routine of FIG. 5 which will be explained further hereinto below. In another embodiment (not shown) in stage 2050 the routine of FIG. 4 when called from the routine of FIG. 3 is exited to stage 1150 of FIG. 3. In yet another embodiment (not shown) in stage 2050 the routine of FIG. 4, when called from the routine of FIG. 5 as will be described further hereinto below, is exited to stage 3140 of FIG. 5.

Figure 5:
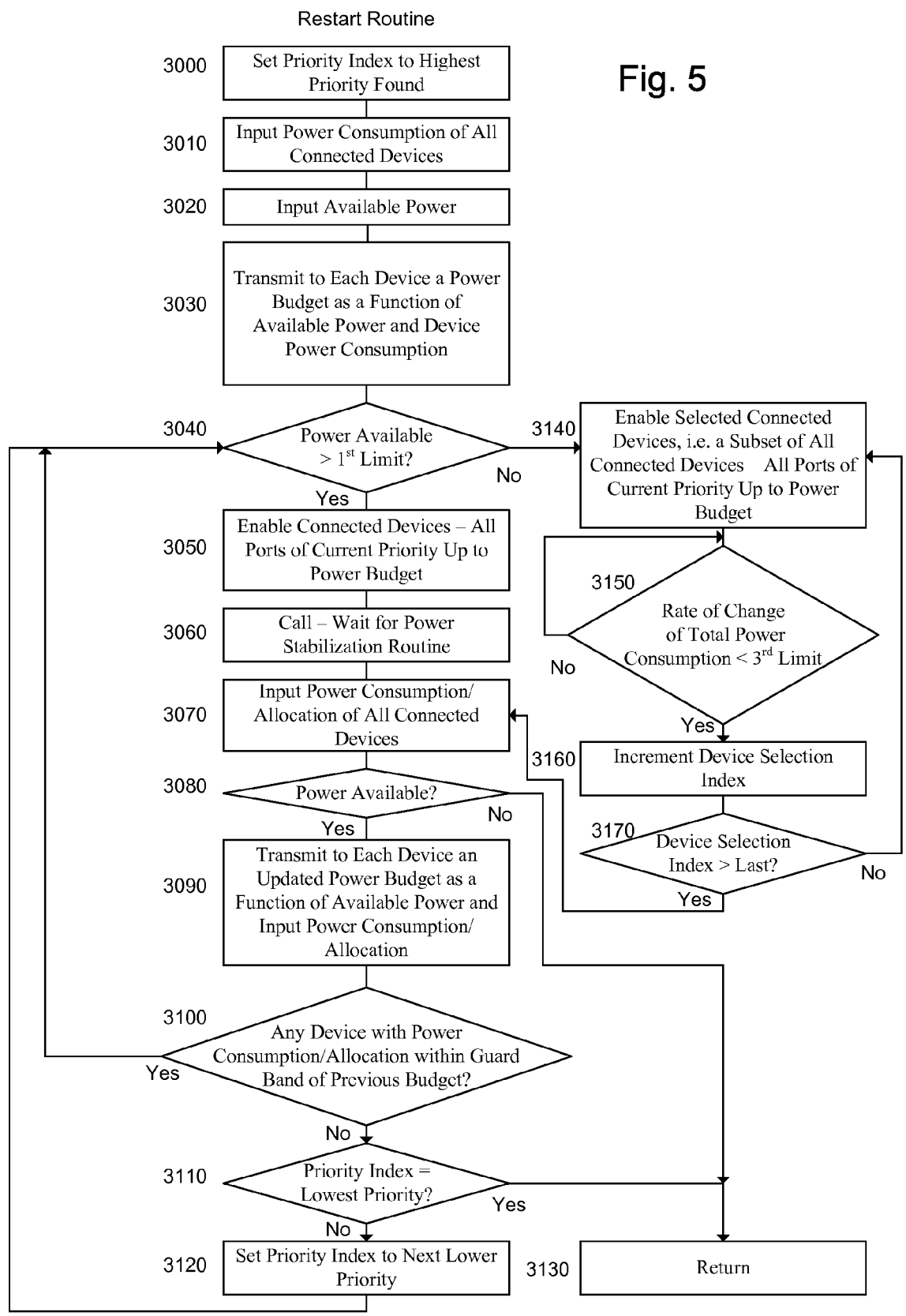
FIG. 5 is a high level flow chart of the operation of the power manager of FIG. 2A after a power supply event indicating a reduction in available power, or in the event that total power consumption exceeds a predetermined limit in accordance with the principle of the current invention.

Thus the routine of FIG. 4 either returns from stage 2030 once the rate of change of power consumption has stabilized to be less than the third predetermined limit, or returns with a pointer to the routine of FIG. 5 in the event that total power consumption is greater than the second predetermined limit. It is to be understood that the above is described as a called subroutine with different exits or returns, however this is not meant to be limiting in any way. Many other methods of programming, and their appropriate languages, are known to those skilled in the art to accomplish the above detection of power stabilization and comparison with the second predetermined limit.

FIG. 5 is a high level flow chart of the operation of the management module. 170 of FIG. 2A in the event that the routine of FIG. 4 has indicated that total power consumption is greater than the second predetermined limit or in response to a power supply event indicating a reduction in available power in accordance with the principle of the current invention. The method of FIG. 5 may also be called due to other events such as the recognition of a new attached device or a change in priority of at least one port.

In stage 3000 a priority index is set to the highest priority found within system 100. In an exemplary embodiment a total of 3 independent priority levels are established. In stage 3010 power consumption of all PoE devices 130 is input. In one embodiment management module 170 communicates with each PoE controller 160 and receives an indication of power consumption. In another embodiment power consumption is input based on current indicator 127 of power supplies 120. In stage 3020 information regarding the total available power for powering PoE devices 130 is input. In an exemplary embodiment status information 125 provides information regarding power availability. In another embodiment a host controller or computer is operable by a user to input a rated power capability of each power supply 120 exhibiting a power good signal via status information 125. In one embodiment the rated power is discounted by an estimate of the power usage of management module 170 and other inherent losses in the system including power used by each PoE controller 160 and PoE managing circuit 40. In one embodiment the power usage reported by PoE controller 160 comprises power being transmitted to connected PDs 50, and therefore does not comprise power utilized by PoE controller 160 and PoE managing circuit 40. In such an embodiment management module 170 must additionally preserve a power budget for these unreported usages. In another embodiment the power usage reported by PoE controller 160 comprises power allocated by a PoE managing circuit 40 irrespective of the amount of power drawn by a PD 50.

In stage 3030 a power budget is determined for each PoE device 130. In one embodiment the total available power input in stage 3010 is divided equally among PoE devices 130. In another embodiment the total available power input in stage 3020 is allocated among PoE devices 130 in accordance with the number of ports in each of the PoE devices 130. Thus, in an embodiment in which a first PoE device 130 supports twice as many ports as a second PoE device 130, the first PoE device 130 is allocated twice the power budget of the second PoE device 130. In yet another embodiment the power budget is determined in accordance with priority, thus PoE devices 130 exhibiting high priority ports are allocated a power budget ahead of PoE devices 130 exhibiting exclusively low priority ports. The above embodiments are not meant to be limiting in any way and are specifically meant to include utilizing a combination of factors to allocate a power budget. The power budgets determined are transmitted to PoE controller 160 of each respective PoE device 130 and stored in management module 170.

In stage 3040 the total available power determined in stage 3020 is compared to a first predetermined limit. In an exemplary embodiment the first predetermined limit is associated with the inrush current requirements of the associated PoE devices 130. In one non-limiting example, each PoE controller 160 is operable to notify management module 170 of the amount of ports which may be simultaneously powered. In an exemplary embodiment each PoE managing circuit 40 is limited to a single inrush current at time, i.e. each PoE managing circuit 40 may enable only port at a time. The inrush current at port enablement exhibits a limit of up to 450 mA in accordance with aforementioned standard, and this inrush current may be independent of a normal low operating current. Thus, in one embodiment a PD 50 exhibiting a power usage of only 7 watts may exhibit an inrush current at enabling of approximately 25 watts. Furthermore, in one embodiment PoE controller 160 does not take inrush current into account, and thus power usage may be over budget during port enabling. A plurality of PoE devices 130 exhibiting an excess inrush current simultaneously is preferably avoided by setting the first predetermined limit equal to the inrush current expected from each PoE device 130 times the number of PoE devices 130. The first predetermined limit may not be a fixed value, and may be determined at each execution of stage 3040 as a function of power consumption, number of devices and other factors.

In the event that in stage 3040 the total available power is greater than the first predetermined limit, in stage 3050 all ports of priority equal to the priority index are enabled by sending a command to PoE controllers 160 of the respective PoE devices 130. In an exemplary embodiment a broadcast message is sent enabling powering of all connected ports of priority equal to the priority index. It is to be understood that enabling is only authorized up to the power budget determined and transmitted in stage 3030. As described above, the power budget does not take into account inrush current issues. PoE controllers 160 thus operate respective PoE managing circuits 40 to detect, optionally classify and power any detect PD 50 connected to a port of the priority equal to the priority index.

In stage 3060 a wait routine as described above in relation to FIG. 4 is called. The wait routine preferably is operable to ensure that power has stabilized in response to the enabling of stage 3050 prior to proceeding to stage 3070. In an exemplary embodiment the routine of FIG. 4 is operable to ensure that the derivative of the change in power usage is below a predetermined second limit thus ensuring that powering responsive to stage 3050 is complete prior to proceeding to stage 3070. In stage 3070 power consumption of all PoE devices 130 is input. In one embodiment management module 170 communicates with each PoE controller 160 and receives an indication of power consumption. In another embodiment power consumption is input based on current indicator 127 of power supplies 120, however in this embodiment an indication of power consumption is input from each PoE device 130 and stored for use with stage 3090 as will be described further. Stage 3070 has been described as being based solely on actual power consumption however this is not meant to be limiting in any way and is specifically meant to include operation based on power allocation by classification. In one such embodiment in stage 3070 all PoE devices 130 report the power allocated to detected and classified PDs 50.

In stage 3080 power availability is determined as a function of the available total power input in stage 3020 and the total power consumption or power allocation by classification input in stage 3070. In one embodiment power available less than the inrush current of a single PD 50 is considered as no available power. In another embodiment power supplies 120 are capable of supplying inrush current in excess of a steady state maximum power and power available less than the power requirement of a single PD 50 is considered as no available power.

In the event that in stage 3080 available power is found, in stage 3090 an updated power budget for each PoE device 130 is determined as a function of the available total power input in stage 3020 and the total power consumption or power allocation by classification input in stage 3070. In one embodiment an unused power is determined as the difference between the available total power input in stage 3020 and the total power consumption or power allocation by classification input in stage 3070. The unused power is in one further embodiment divided equally among PoE devices 130 and in another further embodiment the unused power is allocated among PoE devices 130 in accordance with the number of ports in each of the PoE devices 130. In yet another embodiment the unused power is allocated in accordance with priority, thus PoE devices 130 exhibiting high priority ports are allocated unused power ahead of PoE devices 130 exhibiting exclusively low priority ports. The above embodiments are not meant to be limiting in any way and are specifically meant to include utilizing a combination of factors to divide any unused power. Additionally, a combination of actual power consumption and allocation may be utilized. For example in an embodiment reporting power allocation by classification, power consumption is further reviewed to ensure that no PoE devices 130 have power consumption in excess of allocation due to a PD 50 drawing more power than was allocated by PoE managing circuit 40.

The unused power herein allocated is added to the previous power budget determined and stored, for example in stage 3030. Any previous power budget stored by management module 170 is relabeled as a previous power budget and saved in management module 170. The updated power budgets determined are transmitted to PoE controller 160 of each PoE device 130 and stored as the current power budget. The updated power budgets and the previous power budget are thus both stored by management module 170.

In stage 3100 the power consumption or allocation by classification input from each PoE device 130 in stage 3070 is compared to the respective previous power budget stored in stage 3090. In the event that for any PoE device 130 the power consumption or allocation by classification input in stage 3070 is within a predetermined guard band of previous power budget, stage 3040 as described above is repeated. The guard band is pre-selected to ensure that subsequent powering of a detected PD 50 will not result in PoE device 130 exceeding the power budget allocated. In another embodiment stage 3100 is replaced by inputting from each PoE device 130 a report indicating that at least one port of the current priority or higher has not been enabled due to the previous power budget. Thus, an updated power budget is determined and transmitted in stage 3090, and in response at least one PoE device 130 whose power consumption was within the predetermined guard band of the previous power budget may upon receiving an enable command power at least one additional port of a priority equal to or greater than the priority index.

In the event that in stage 3100 for all PoE devices 130 the power consumption or allocation by classification input in stage 3070 is not within a predetermined guard band of previous power budget, in stage 3110 the priority index is compared with a lowest priority. In one embodiment the lowest priority is a predetermined value, and in another embodiment the lowest priority is determined from among all priorities found in system 100. In the event that the priority index is not equal to the lowest priority, in stage 3120 the priority index is set to the next lower priority and stage 3040 as described above is again executed. In the event that in stage 3110 the priority index is equal to the lowest priority, in stage 3130 the method has enabled powering of all powerable ports of all priorities and returns.

In the event that in stage 3080 no available power is found, in stage 3130 the method has enabled powering of all powerable ports within the available power and returns.

In the event that in stage 3040 the total available power is not greater than the first predetermined limit, in stage 3140 at least one PoE device 130, i.e a subset of PoE devices 130 of stage 3010 and stage 3030, is commanded to enable all ports of a priority equal to the priority index by sending a command to PoE controllers 160 of the respective PoE devices 130.

The number of PoE devices 130 to be so commanded is a function of the amount of available power and in particular the tolerance of power supplies 120 to inrush current. In one embodiment each PoE device 130 is individually enabled and in another embodiment a plurality of PoE devices 130 the sum of whose potential inrush current will not exceed the total available inrush current capability of power supplies 120 are enabled. Each enabled PoE device 130 is only authorized to enable ports of the priority index up to the allocated power budget. The allocated power budget may be the power budget originally determined and transmitted in stage 3030, or an updated power budget as determined and transmitted in stage 3090. As described above, the power budget does not take into account inrush current issues. PoE controllers 160 thus operate respective PoE managing circuits 40 to detect, optionally classify and power any detect PD 50 connected to a port of the priority equal to the priority index.

In stage 3150 the rate of change of total power consumption as input from power supplies 120 is observed and compared with a third predetermined limit. In an exemplary embodiment the third predetermined limit is set to allow for normal power variations during operation while detecting a leveling in power usage. Thus a rapid increase in power usage during enabling of ports is detected and completion of the powering is determined without requiring further communication between management module 170 and each of the plurality of PoE devices 130. In an exemplary embodiment stage 3150 is performed by fuzzy logic. Stage 3150 is described herein as observing the rate of change of total power consumption, however this is not meant to be limiting in any way. Stage 3150 may be replaced with a stage awaiting confirmation from each of the enabled plurality of PoE devices 130 that enabling has been completed without exceeding the scope of the invention.

In the event that in stage 3150 the rate of change of total power consumption is not less than the third predetermined limit, stage 3150 is again executed. In the event that in stage 3150 the rate of change of total power consumption is less than the third predetermined limit, in stage 3160 the list of devices is incremented to point to devices that have not yet been enabled by the operation of stage 3140. In stage 3170 the incremented list is compared with a last device pointer. In the event that the last device has been reached, i.e. all PoE devices 130 have been enabled by an operation of stage 3140 stage 3070 as described above is executed. In the event that the last device has not been reached, i.e. at least one PoE device 130 has not yet been enabled by the operation of stage 3140, stage 3140 is again executed for at least one PoE device 130 which has not yet been enabled.

Thus the method of FIG. 5 enables powering of all ports in the system, while maintaining priority. It is to be understood that at the completion of the method of FIG. 5 each PoE device 130 receives a power budget and is enabled to operate autonomously within the received power budget while observing local priorities. Thus, in an event of communication interruption, each PoE device is able to continue operation without interruption. Such a method is advantageously thus not reliant on a continued communication link between each PoE device 130 and management module 170 to ensure operation.

FIG. 6 is a high level flow chart of an ongoing operation of management module 170 of FIG. 2A to maintain a potential scenario chart comprising power budgets for each PoE device 130 according to an aspect of the invention. In stage 4000 power consumption or allocation by classification of all PoE devices 130 is input. In one embodiment management module 170 communicates with each PoE controller 160 and receives an indication of power consumption. In another embodiment power consumption is input based on current indicator 127 of power supplies 120. In yet another embodiment allocation of power by classification is input as total power consumption. In stage 4010 the total power consumption or allocation by classification input in stage 4000 is compared with a predetermined second limit. In an exemplary embodiment the second limit is an overall guard band for system 100 in which no additional ports may be powered without reaching inrush current limits of the overall system. In an exemplary embodiment the second limit is associated with the inrush current requirements of the associated PoE devices 130, the number of PoE devices which have been enabled, and the inrush current capabilities of power supplies 120. In one non-limiting example, each PoE controller 160 is operable to notify management module 170 of the amount of ports which may be simultaneously powered. In one embodiment the second predetermined limit is the same as the first predetermined limit described above in relation to stage 1050 of FIG. 3 and 3040 of FIG. 5. Thus, an overall guard band enables each power budget as transmitted to the individual PoE devices 130 to be used to the maximum extent possible, with system power being maintained within a safe range by other PoE devices 130 not utilizing their full budgeted power.

In the event of usage up to the maximum budgeted power by a plurality of PoE devices 130, an overall guard band is thus maintained by the operation of stage 4010. The guard band thus prevents damage to power supplies 120 by the simultaneous start up of a plurality of ports and their associated large inrush current.

In the event that in stage 4010 the total power consumption input in stage 4000 is not greater than the second predetermined limit, in stage 4020 for each power supply scenario a power budget for each device is determined. In an exemplary embodiment a power supply scenario is defined as the loss of one or more of the plurality of power supplies 120 of FIG. 2A. In the event that all of the plurality of power supplies 120 are of the same rating, only a single scenario for each number of remaining power supplies is required. In the event that some or all of the plurality of power supplies 120 exhibit different power ratings, each potential total power output of the plurality of power supplies 120 for which one of the power supplied have failed is taken as a potential scenario. For each of the potential scenarios a revised required power budget for each PoE device 130 is determined. Stage 4020 will be described herein as being responsive to status indicator 125 of each power supply having a binary value in which a value of 1 indicates full rated power availability and a value of 0 indicates no power. This is not meant to be limiting in any way, and a multiplicity of values, including derating due to an increased temperature or stress level is specifically intended.

Table I is a representation of an embodiment of the potential scenario chart produced as an outcome of stage 4020 in accordance with the principle of the invention.

indicator 125 of one of the power supplies 120, a broadcast of the scenario number to activate is done on the provided emergency bus as described above in relation to FIG. 2A.

In stage 4040 new PoE devices 130 are searched for. In the event that a new PoE device 130 is found, an address is assigned and in stage 4100 the restart routine of FIG. 5 is called. In the event that in stage 4040 no new PoE device 130 is found, in stage 4050 a change in priority of any port in any PoE device 130 is searched for. In the event that in stage 4050 a change in priority in any port in any PoE device 130 is found, in stage 4100 the restart routine of FIG. 5 is called. In the event that in stage 4050 no change in priority in any port in any PoE device 130 is found, in stage 4060 the routine returns.

In the event that in stage 4010 the total power consumption input in stage 4000 is greater than the second predetermined limit, in stage 4070 a broadcast message is sent to all PoE device 130 and in particular to their respective PoE controller 160 to stop enabling any additional unpowered ports. Thus, inrush current simultaneously from a plurality of PoE devices 130 is prevented. In one embodiment the broadcast message is sent over the provided emergency bus as described above in relation to FIG. 2A.

In stage 4080 for each power supply scenario a power budget for each device is determined as described above in relation to stage 4020. In stage 4090 the scenarios associated with the power budget for each scenario determined in stage 4080 is transmitted to each of the PoE devices 130. In the event of a change in the value of power indicator 125 of one of power supplies 120, management module 170 will operate

TABLE I

| Power Indicator 125 of Power Supply 1 | Power Indicator 125 of Power Supply 2 | Power Indicator 125 of Power Supply 3 | Total Power Available | Scenario Number | Power Budget Per Device |
|---|---|---|---|---|---|
| 0 | 0 | 0 | 0 Watts | 0 | 0 |
| 0 | 0 | 1 | 500 Watts | 1 | 500/(Number of Devices) |
| 0 | 1 | 0 | 650 Watts | 2 | 650/(Number of Devices) |
| 0 | 1 | 1 | 1150 Watts | 3 | 1150/(Number of Devices) |
| 1 | 0 | 0 | 600 Watts | 4 | 600/(Number of Devices) |
| 1 | 0 | 1 | 1100 Watts | 5 | 1100/(Number of Devices) |
| 1 | 1 | 0 | 1250 Watts | 6 | 1250/(Number of Devices) |
| 1 | 1 | 1 | 1750 Watts | 7 | 1750/(Number of Devices) |

For each possible combination of power indicators 125 a total power available is determined and a scenario number is assigned. A total scenario available power is determined and a power budget per device is determined. Table I is described as assigning an equal power budget to each PoE device 130 however this is not meant to be limiting in any way. A scenario power budget may be based on ports per PoE device 130, or take into priority without exceeding the scope of the invention. In one embodiment power is budgeted for all high priority enabled ports first, and then subsequent enabled ports of lower priority are budgeted.

In stage 4030 the scenarios associated with the power budget for each scenario is transmitted to each of the PoE devices 130. In the event of a change in the value of power indicator 125 of one of power supplies 120, management module 170 will operate to broadcast the scenario number to change to in a manner that will be further described below. In one embodiment the scenarios are transmitted on a regular basis, or in the event of a change in consumption. In an exemplary embodiment, the scenarios are transmitted on the first bus, and in the event of a change in the value of power to broadcast the scenario number to change to in a manner that will be further described below. In stage 4100 the routine is exited to the restart routine of FIG. 5.

Thus, the routine of FIG. 6 prepares and transmits potential power event scenarios to each connected PoE device 130 associated with a potential power budget for each of the scenarios and in the event of the discovery of any new devices, changes in priority of any port within system 100 or total power consumption exceeding the second predetermined limit exits to the restart routine of FIG. 5.

Figure 7:
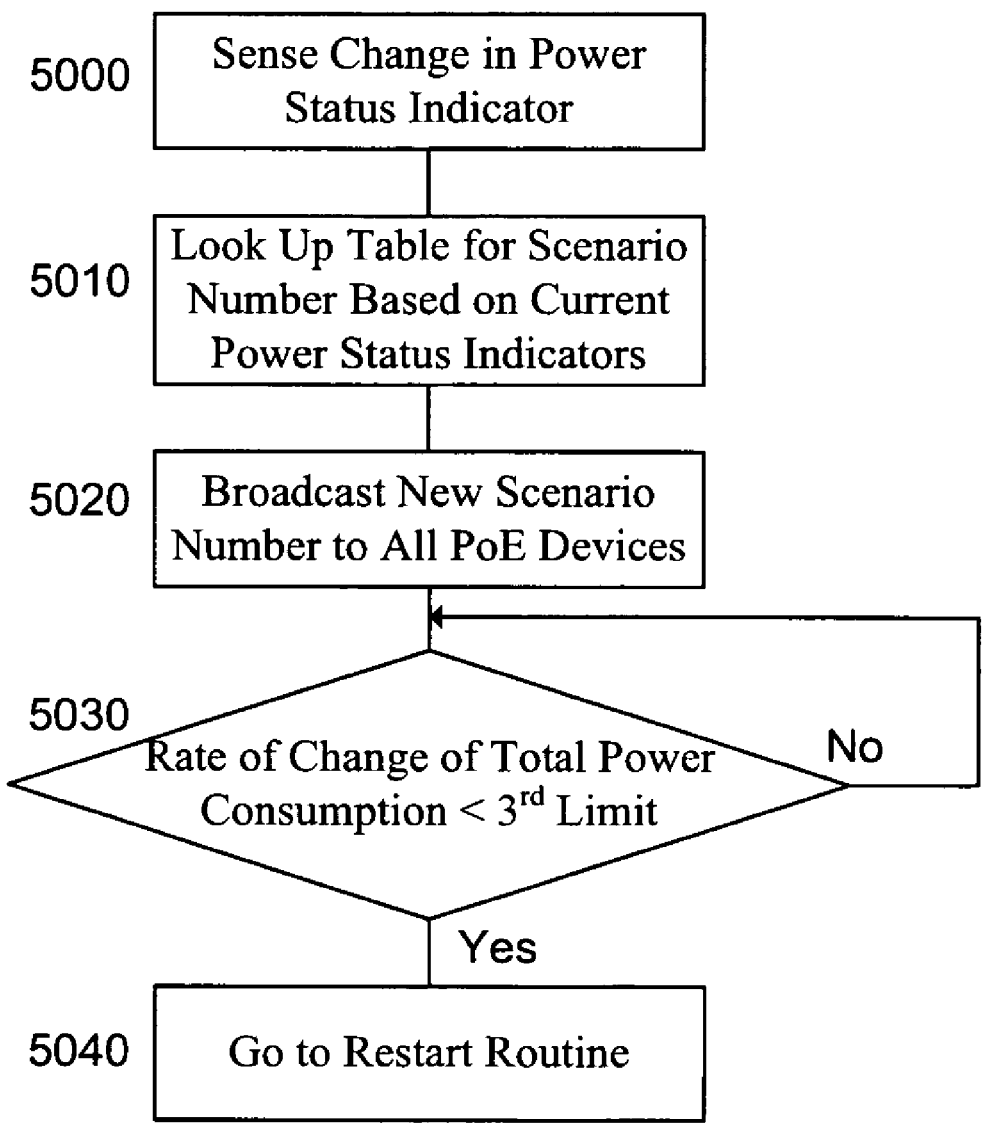
FIG. 7 is a high level flow chart of the operation of the controller of FIG. 2A, in accordance with the principle of the invention, in the event of a change in power condition associated with one or more power sources.

FIG. 7 is a high level flow chart of an operation of management module 170 of FIG. 2A in the event of a change in any status indicator 125 in accordance with the principle of the invention.

In stage 5000 a change in power status indicator is sensed. As described above, the power status indicator in one embodiment presents a binary value indicating either full or no power, and in another embodiment presents a plurality of values indicative of a need to derate the power supply 120 associated with the status indicator 125. In stage 5010 the table generated in stage 4040 of FIG. 6 is retrieved from memory, and the scenario number associated with the current status indicators 125 is retrieved. In stage 5020 the scenario number retrieved in stage 5010 is broadcast to all PoE devices 130. In one embodiment the scenario number is broadcast on the provided emergency bus as described above in relation to FIG. 2A. It is to be understood that PoE controller 160 of each PoE device 130, upon receipt of the broadcast immediately acts to update the local power budget to the amount received in stage 4050 of FIG. 6. Each PoE controller 160 further operates as required to disconnect ports if required, preferably observing local priority, to achieve the revised local power budget. Furthermore, preferably each PoE controller 160 awaits further instructions prior to enabling any new ports, i.e. the receipt of a change scenario number broadcast also preferably acts as a stop powering of additional ports command as described in relation to stage 2040 of FIG. 4.

In stage 5030 total power consumption, preferably as determined by current indicators 127, is monitored to ensure that power has stabilized such that the rate of change of total power consumption is less than the third predetermined limit described above in relation to FIG. 4. In an exemplary embodiment stage 5030 is implemented using fuzzy logic. In the event that total power consumption has not stabilized stage 5030 is repeated. In the event that in stage 5030 total power consumption has stabilized in stage 5040 the restart routine as described above in relation to FIG. 5 is called. Stage 5030 is described herein as observing the rate of change of total power consumption, however this is not meant to be limiting in any way. Stage 5030 may be replaced with a stage awaiting confirmation from each of the enabled plurality of PoE devices 130 that disconnecting of ports has been completed without exceeding the scope of the invention.

The implementation of the methods of FIGS. 6 and 7, as described above in relation to Table I, thus enable a pre-planned power reduction to ports in the event that any change to the power source condition occurs. The table is updated regularly according to the method of FIG. 6, and represents a list of scenarios and allocated power budgets for each PoE device 130 in the event that the power source condition changes from the current power source condition, to any other condition.

Thus the present embodiments enable rapidly powering a large number of ports connected to disparate PoE devices, each of the PoE devices receiving power from a central power source. Preferably the central power source comprises a plurality of power supplies. This is provided by inputting an indication of available power, and allocating a power budget to each PoE device connected based on the input available power. Ports of a first priority are then enabled, with each PoE device powering ports of the first priority up to the allocated power budget. PoE devices which are unable to power ports of the first priority due to the limitation of the power budget subsequently receive an updated power budget until all ports of the first priority are powered.

According to an aspect of the invention power consumption is monitored after an enabling command is transmitted. Power consumption is monitored until stabilization indicative that all ports have been powered responsive to the enabling command is recognized.

In the event that sufficient power is available, ports of the next priority are then powered in a similar fashion. Thus all ports of a higher priority are enabled prior to enabling ports of a lower priority. Furthermore there is no requirement for confirmation that powering has been completed. The use of power budgets further allows for continued operation in the event of a communication failure.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A method for rapidly powering a plurality of power over Ethernet ports, the method comprising:
   inputting an indication of available power;
   allocating a power budget to each of a first plurality of power over Ethernet devices, each of said power over Ethernet devices powering at least one power over Ethernet port, said power budget being a function of said indication of available power;
   transmitting, in the event that said indication of available power is greater than a first predetermined amount, an enabling command to said first plurality of power over Ethernet devices, said command enabling the powering of ports of a first priority associated with said first plurality of power over Ethernet devices, each of said first plurality of power over Ethernet devices powering ports of said first priority within said power budget; and
   transmitting, in the event that said indication of an amount of available power is not greater than said first predetermined amount, an enabling command to one of a single power over Ethernet device and a second plurality of power over Ethernet devices, said second plurality being a subset of said first plurality, said command enabling the powering of ports of said first priority associated with said one of a single power over Ethernet device and a second plurality of power over Ethernet devices, each of said one of a single power over Ethernet device and a second plurality of power over Ethernet devices powering ports of said first priority within said power budget.

2. A method according to claim 1, wherein said power budget is allocated equally to all of said first plurality of power over Ethernet devices.

3. A method according to claim 1, wherein said power budget is allocated to each of said first plurality of power over Ethernet devices as a function of the number of ports per power over Ethernet device.

4. A method according to claim 1, wherein said power budget is allocated to each of said first plurality of power over Ethernet devices as a function of priority of ports associated with each power over Ethernet device.

5. A method according to claim 1, wherein said first predetermined amount is a function of inrush current associated with at least one power over Ethernet port.

6. A method according to claim 1, further comprising after said transmitting an enabling command:
monitoring an indication of power consumption; and
in the event said monitored indication of power consumption has stabilized:
allocating an updated power budget to each of said first plurality of power over Ethernet devices, said power budget being a function of said available power and said monitored indication of power consumption.

7. A method according to claim 6, wherein said stabilization of said indication of power consumption is determined by fuzzy logic.

8. A method according to claim 6, wherein said stabilization of said indication of power consumption is determined by comparing the rate of change of said monitored indication of power consumption with a second predetermined limit.

9. A method according to claim 6, further comprising after said allocating an updated power budget:
transmitting an enabling command to said first plurality of power over Ethernet devices, said command enabling the powering of ports of a second priority associated with said first plurality of power over Ethernet devices, each of said first plurality of power over Ethernet devices powering ports of said second priority within said updated power budget, said second priority being lower than said first priority.

10. A method according to claim 6, further comprising after said allocating an updated power budget:
inputting an updated indication of available power;
in the event that said updated indication of available power is greater than said first predetermined amount,
transmitting an enabling command to said first plurality of power over Ethernet devices, said command enabling the powering of ports of a second priority associated with said first plurality of power over Ethernet devices, each of said first plurality of power over Ethernet devices powering ports of said second priority within said updated power budget, said second priority being lower than said first priority.

11. A method according to claim 10, where said indication of available power is a function of power allocated by at least one power over Ethernet device.

12. A method according to claim 1 further comprising:
inputting an indication of one of total power consumption and total power allocation;
comparing said indication of one of total power consumption and total power allocation with a third predetermined amount; and
in the event said indication of one of total power consumption and total power allocation exceeds said third predetermined amount;
transmitting a command to stop powering additional ports to said first plurality of power over Ethernet devices.

13. A method according to claim 12, wherein said third predetermined amount is associated with a guard band for the plurality of power over Ethernet devices.

14. A system for powering a plurality of power over Ethernet ports, the system comprising:
at least one power source;
a power manager receiving an indication of power available from said at least one power source
a first plurality of power over Ethernet devices responsive to said power manager and arranged to receive power from said at least one power source, each of said power over Ethernet devices being operable to supply power for at least one power over Ethernet pod associated therewith;
said power manager being operative to:
allocate a power budget to each of a first plurality of power over Ethernet devices, said power budget being a function of said indication of available power;
transmit in the event that said indication of available power is greater than a first predetermined amount, an enabling command for ports of a first priority to said first plurality of power over Ethernet devices, said first plurality of power over Ethernet devices being operable responsive to said transmitted enabling command to enable the powering of power over Ethernet ports associated therewith having said first priority, each of said first plurality of power over Ethernet devices powering ports of said first priority within said power budget; and
transmit, in the event that said indication of an amount of available power is not greater than said first predetermined amount, an enabling command for ports of said first priority to one of a single power over Ethernet device and a second plurality of power over Ethernet devices, said second plurality being a subset of said first plurality, said one of a single power over Ethernet device and a second plurality of power over Ethernet devices being operable responsive to said enabling command to enable the powering of nods of said first priority associated therewith, each of said one of a single power over Ethernet device and a second plurality of power over Ethernet devices powering ports of said first priority within said power budget.

15. A system according to claim 14, wherein said power budget is allocated equally to all of said first plurality of power over Ethernet devices.

16. A system according to claim 14, wherein said power budget is allocated to each of said first plurality of power over Ethernet devices as a function of the number of ports per power over Ethernet device.

17. A system according to claim 14, wherein said power budget is allocated to each of said first plurality of power over Ethernet devices as a function of priority of ports associated with each power over Ethernet device.

18. A system according to claim 14, wherein said first predetermined amount is a function of inrush current associated with at least one power over Ethernet port.

19. A system according to claim 14, wherein said power manager is further operable to:
monitor an indication of power consumption; and
in the event said monitored indication of power consumption has stabilized:
allocate an updated power budget to each of said first plurality of power over Ethernet devices, said power budget being a function of said available power and said monitored indication of power consumption.

20. A system according to claim 19, wherein said stabilization of said indication of power consumption is determined by fuzzy logic.

21. A system according to claim 19, wherein said stabilization of said indication of power consumption is determined by said power manager being operable to compare the rate of change of power consumption with a second predetermined limit.

22. A system according to claim 19, wherein said power manager is further operative to transmit an enabling command for ports of a second priority to said first plurality of power over Ethernet devices, said power over Ethernet devices being operable responsive to said received command to enable the powering of ports of a second priority associated with said first plurality of power over Ethernet devices within said updated power budget, said second priority being lower than said first priority.

23. A system according claim 19, wherein said power manager is further operative in the event said monitored indication that power consumption has stabilized to:
  input an updated indication of available power;
  in the event that said updated indication of available power is greater than said first predetermined amount,
  transmit an enabling command for ports of a second priority to said first plurality of power over Ethernet devices, each of said first plurality of power over Ethernet devices being operative responsive to said enabling command to power ports of said second priority within said updated power budget, said second priority being lower than said first priority.

24. A system according to claim 14, wherein said power manager is further operative to:
  input an indication of total power consumption;
  compare said indication of total power consumption with a third predetermined amount; and
  in the event said indication of total power consumption exceeds said third predetermined amount;
  transmit a command to stop powering additional ports to said first plurality of power over Ethernet devices.

25. A system according to claim 24, wherein said third predetermined amount is associated with a guard band for the plurality of power over Ethernet devices.

26. A system for powering a plurality of power over Ethernet ports, the system comprising:
  at least one power source;
  a plurality of power over Ethernet devices circuits receiving power from said at least one power source, each of said power over Ethernet devices controlling power for at least one power over Ethernet port;
  a power manager receiving an indication of power availability and power consumption from said at least one power source;
  said power manager being operative to:
    transmit a power allocation to each of said plurality of power over Ethernet devices, said power allocation being a function of said indication of power availability;
    transmit an enabling command for ports of a first priority to said plurality of power over Ethernet devices;
    monitor said indication of power consumption from said at least one power source; and
    transmit in the event that the rate of change of said monitored power consumption indication is less than a predetermined amount and additional power is available responsive to said monitored indication of power consumption, an enabling command for ports of a second priority to said plurality of power over Ethernet devices, said second priority being lower than said first priority.

27. A system according to claim 26, wherein said at least one power source comprises a plurality of power sources.

28. A system according to claim 27, wherein said indication of power availability is responsive to an output of each of said plurality of power sources.

29. A method for rapidly powering a plurality of power over Ethernet ports, the method comprising:
  inputting an indication of available power;
  allocating a power budget to each of a first plurality of power over Ethernet devices, each of said power over Ethernet devices powering at least one power over Ethernet port, said power budget being a function of said indication of available power;
  transmitting an enabling command for ports of a first priority to said first plurality of power over Ethernet devices, each of said first plurality of power over Ethernet devices powering ports of said first priority within said power budget;
  monitoring an indication of power consumption until said monitored indication of power consumption has stabilized to a rate of change less than a predetermined amount;
  allocating an updated power budget to each of said first plurality of power over Ethernet devices, said power budget being a function of said available power and said monitored indication of power consumption; and
  transmitting, in the event that additional power is available responsive to said monitored power indication of power consumption, an enabling command for ports of a second priority to said first plurality of power over Ethernet devices, said second priority being lower than said first priority.

30. A method for rapidly powering a plurality of power over Ethernet ports, the method comprising:
  inputting an indication of available power;
  allocating a power budget to each of a first plurality of power over Ethernet devices as a function of the number of ports per power over Ethernet device, each of said power over Ethernet devices powering at least one power over Ethernet port, said power budget being further a function of said indication of available power; and
  transmitting, in the event that said indication of available power is greater than a first predetermined amount, an enabling command to said first plurality of power over Ethernet devices, said command enabling the powering of ports of a first priority associated with said first plurality of power over Ethernet devices, each of said first plurality of power over Ethernet devices powering ports of said first priority within said power budget.

31. A system for powering a plurality of power over Ethernet ports, the system comprising:
  at least one power source;
  a power manager receiving an indication of power available from said at least one power source
  a first plurality of power over Ethernet devices responsive to said power manager and arranged to receive power from said at least one power source, each of said power over Ethernet devices being operable to supply power for at least one power over Ethernet port associated therewith;
  said power manager being operative to:
  allocate a power budget to each of a first plurality of power over Ethernet devices as a function of the number of ports per power over Ethernet device, said power budget being further a function of said indication of available power; and
  in the event that said indication of available power is greater than a first predetermined amount,
  transmit an enabling command for ports of a first priority to said first plurality of power over Ethernet devices, said first plurality of power over Ethernet devices being operable responsive to said transmitted enabling command to enable the powering of power over Ethernet ports associated therewith having said first priority, each of said first plurality of power over Ethernet devices powering ports of said first priority within said power budget.

* * * * *